United States Patent
Baghel et al.

(10) Patent No.: US 11,323,228 B2
(45) Date of Patent: May 3, 2022

(54) FEEDBACK FOR SIDELINK COMMUNICATIONS

(71) Applicant: QUALCOMM Incorporated, San Diego, CA (US)

(72) Inventors: Sudhir Kumar Baghel, Hillsborough, NJ (US); Arjun Bharadwaj, Cupertino, CA (US); Kapil Gulati, Hillsborough, NJ (US); Tien Viet Nguyen, Bridgewater, NJ (US); Shailesh Patil, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/736,702

(22) Filed: Jan. 7, 2020

(65) Prior Publication Data
US 2020/0228290 A1 Jul. 16, 2020

Related U.S. Application Data

(60) Provisional application No. 62/790,823, filed on Jan. 10, 2019.

(51) Int. Cl.
*H04L 5/00* (2006.01)
*H04L 1/18* (2006.01)
*H04W 92/18* (2009.01)

(52) U.S. Cl.
CPC .......... *H04L 5/0055* (2013.01); *H04L 1/1812* (2013.01); *H04L 5/0007* (2013.01); *H04W 92/18* (2013.01)

(58) Field of Classification Search
CPC ..... H04W 92/18; H04W 76/14; H04W 72/02; H04W 72/10; H04W 72/14;
(Continued)

(56) References Cited

U.S. PATENT DOCUMENTS

2013/0322276 A1* 12/2013 Pelletier ............ H04W 72/0453
370/252
2017/0141831 A1* 5/2017 Alvarino ................. H04W 4/70
(Continued)

FOREIGN PATENT DOCUMENTS

| WO | 2018175553 A1 | 9/2018 |
|---|---|---|
| WO | 2019036578 A1 | 2/2019 |
| WO | 2019195505 A1 | 10/2019 |

OTHER PUBLICATIONS

Huawei, et al., "Sidelink CSI", 3GPP Draft, R1-1813553, vol. Ran WG1. No. Spokane, USA, Nov. 12 2018-Nov. 16, 2018, Nov. 3, 2018 (Nov. 3, 2018), XP051479891 ,6 pages, Retrieved from the Internet: URL: http://www.3gpp.org/ftp/tsg%5Fran/WG1%5FRL1/TSGR1%5F95/Docs/R1%2D1813553%2Ezip. [retrieved on Npv. 3, 2018] Sections 1-5.
Huawei, et al., "Sidelink Physical Layer Procedures for NR V2X", 3GPP Draft, R1-1812205, vol. RAN WG1. No. Spokane. USA, Nov. 12, 2018-Nov. 16, 2018, Nov. 3, 2018 (Nov. 3, 2018), XP051478361, 12 pages, Retrieved from the Internet: URL: http://www.3gpp.org/ftp/tsg%5Fran/WG1%5FRL1/TSGR1%5F95/Docs/R1%2D1812205%2Ezip. [retrieved on Nov. 3, 2018] Sections 1-8.
International Search Report and Written Opinion—PCT/US2020/012762—ISA/EPO—dated Apr. 28, 2020.
(Continued)

*Primary Examiner* — Peter Chen
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive a sidelink communication on a sidelink between the UE and another UE. The UE may transmit, on the sidelink, one or more feedback communications associated with the sidelink communication in a reporting period having a configurable periodicity and/or being configured to occupy an entire bandwidth of a resource pool configured for the sidelink. Numerous other aspects are provided.

70 Claims, 11 Drawing Sheets

(58) Field of Classification Search
CPC ............. H04W 72/042; H04W 72/048; H04W 72/0446; H04W 72/0406; H04W 72/121; H04W 72/1257; H04W 72/1289; H04W 88/02; H04W 88/04; H04W 4/70; H04W 24/10; H04L 5/0005; H04L 5/0007; H04L 5/0051; H04L 5/0053; H04L 5/0055; H04L 5/0057; H04L 5/0082; H04L 1/1812; H04B 7/0621; H04B 7/0632; Y02D 70/21; Y02D 70/22
See application file for complete search history.

(56) References Cited

U.S. PATENT DOCUMENTS

| | | | |
|---|---|---|---|
| 2017/0353971 A1* | 12/2017 | Gupta | A43B 5/02 |
| 2018/0213379 A1* | 7/2018 | Xiong | H04W 88/04 |
| 2018/0234980 A1 | 8/2018 | Li et al. | |
| 2019/0044667 A1 | 2/2019 | Guo et al. | |
| 2019/0174483 A1* | 6/2019 | Tsai | H04W 72/0413 |
| 2019/0222255 A1* | 7/2019 | Nammi | H04B 1/7143 |
| 2019/0253198 A1* | 8/2019 | Baldemair | H04W 72/042 |
| 2019/0274054 A1 | 9/2019 | Salem | |
| 2020/0029318 A1* | 1/2020 | Guo | H04L 1/1822 |

OTHER PUBLICATIONS

MCC Support: "Final Report of 3GPP TSG RAN WG1 #94bis v1.0.0" (Chengdu, China, Oct. 8-12, 2018), 3GPP Draft, 3GPP TSG RAN WG1 Meeting #95, R1-1812101, Spokane, USA, Nov. 12-16, 2018, 197 Pages, Retrieved from the Internet: URL: https://www.3gpp.org/ftp/tsg_ran/WG1_RL1/TSGR1_94b/Report/Final_Minutes_report_RAN1%2394b_v100.zip.

MCC Support: "Final Report of 3GPP TSG RAN WG1 #96 v2.0.0" (Athens, Greece, Feb. 25- Mar. 1, 2019), 3GPP Draft, 3GPP TSG RAN WG1 Meeting #96bis, R1-1905837, Xi'an, China, Apr. 8-12, 2019, pp. 1-155, Retrieved from the Internet: URL: https://www.3gpp.org/ftp/tsg_ran/WG1_RL1/TSGR1_96/Report/Final_Minutes_report_RAN1%2396_v200.zip.

MCC Support: "Final Report of 3GPP TSG RAN WG1 #96b v1.0.0" (Xi'an, China, Apr. 8-12, 2019), 3GPP Draft, 3GPP TSG RAN WG1 Meeting #97, R1-1905921, Reno, USA, May 13-17, 2019, pp. 1-159, Retrieved from the Internet: URL: https://www.3gpp.org/ftp/tsg_ran/WG1_RL1/TSGR1_96b/Report/Final_Minutes_report_RAN1%2396b_v100.zip The Whole Document.

* cited by examiner

FEEDBACK FOR SIDELINK COMMUNICATIONS

CROSS-REFERENCE TO RELATED APPLICATION

This application claims priority to U.S. Provisional Patent Application No. 62/790,823, filed on Jan. 10, 2019, entitled "FEEDBACK FOR SIDELINK COMMUNICATIONS," which is hereby expressly incorporated by reference herein.

INTRODUCTION

Aspects of the present disclosure generally relate to wireless communication, and more particularly to techniques and apparatuses for sidelink communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a sidelink communication on a sidelink between the UE and another UE. The method may include transmitting, on the sidelink, one or more feedback communications associated with the sidelink communication in a reporting period having a configurable periodicity.

In some aspects, a UE for wireless communication may include memory and one or more processors coupled to the memory. The memory and the one or more processors may be configured to receive a sidelink communication on a sidelink between the UE and another UE. The memory and the one or more processors may be configured to transmit, on the sidelink, one or more feedback communications associated with the sidelink communication in a reporting period having a configurable periodicity.

In some aspects, a non-transitory computer-readable medium may store one or more instructions for wireless communication. The one or more instructions, when executed by one or more processors of UE, may cause the one or more processors to receive a sidelink communication on a sidelink between the UE and another UE. The one or more instructions, when executed by one or more processors of UE, may cause the one or more processors to transmit, on the sidelink, one or more feedback communications associated with the sidelink communication in a reporting period having a configurable periodicity.

In some aspects, an apparatus for wireless communication may include means for receiving a sidelink communication on a sidelink between the apparatus and another apparatus. The apparatus may include means for transmitting, on the sidelink, one or more feedback communications associated with the sidelink communication in a reporting period having a configurable periodicity.

In some aspects, a method of wireless communication, performed by a UE, may include receiving a sidelink communication on a sidelink between the UE and another UE. The method may include transmitting, on the sidelink, one or more feedback communications associated with the sidelink communication in a reporting period configured to occupy an entire bandwidth of a resource pool configured for the sidelink.

In some aspects, a UE for wireless communication may include memory and one or more processors coupled to the memory. The memory and the one or more processors may be configured to receive a sidelink communication on a sidelink between the UE and another UE. The memory and the one or more processors may be configured to transmit, on the sidelink, one or more feedback communications associated with the sidelink communication in a reporting period configured to occupy an entire bandwidth of a resource pool configured for the sidelink.

In some aspects, a non-transitory computer-readable medium may store one or more instructions for wireless communication. The one or more instructions, when executed by one or more processors of UE, may cause the one or more processors to receive a sidelink communication on a sidelink between the UE and another UE. The one or more instructions, when executed by one or more processors of UE, may cause the one or more processors to transmit, on the sidelink, one or more feedback communications associated with the sidelink communication in a reporting period configured to occupy an entire bandwidth of a resource pool configured for the sidelink.

In some aspects, an apparatus for wireless communication may include means for receiving a sidelink communication on a sidelink between the apparatus and another apparatus. The apparatus may include means for transmitting, on the sidelink, one or more feedback communications associated with the sidelink communication in a reporting period configured to occupy an entire bandwidth of a resource pool configured for the sidelink.

In some aspects, a method of wireless communication, performed by a UE, may include transmitting a sidelink communication on a sidelink between the UE and another UE. The method may include receiving, on the sidelink, one or more feedback communications associated with the sidelink communication in a reporting period having a configurable periodicity.

In some aspects, a UE for wireless communication may include memory and one or more processors coupled to the memory. The memory and the one or more processors may be configured to transmit a sidelink communication on a sidelink between the UE and another UE. The memory and the one or more processors may be configured to receive, on the sidelink, one or more feedback communications associated with the sidelink communication in a reporting period having a configurable periodicity.

In some aspects, a non-transitory computer-readable medium may store one or more instructions for wireless communication. The one or more instructions, when executed by one or more processors of UE, may cause the one or more processors to transmit a sidelink communication on a sidelink between the UE and another UE. The one or more instructions, when executed by one or more processors of UE, may cause the one or more processors to receive, on the sidelink, one or more feedback communications associated with the sidelink communication in a reporting period having a configurable periodicity.

In some aspects, an apparatus for wireless communication may include means for transmitting a sidelink communication on a sidelink between the apparatus and another apparatus. The apparatus may include means for receiving, on the sidelink, one or more feedback communications associated with the sidelink communication in a reporting period having a configurable periodicity.

In some aspects, a method of wireless communication, performed by a UE, may include transmitting a sidelink communication on a sidelink between the UE and another UE. The method may include receiving, on the sidelink, one or more feedback communications associated with the sidelink communication in a reporting period configured to occupy an entire bandwidth of a resource pool configured for the sidelink.

In some aspects, a UE for wireless communication may include memory and one or more processors coupled to the memory. The memory and the one or more processors may be configured to transmit a sidelink communication on a sidelink between the UE and another UE. The memory and the one or more processors may be configured to receive, on the sidelink, one or more feedback communications associated with the sidelink communication in a reporting period configured to occupy an entire bandwidth of a resource pool configured for the sidelink.

In some aspects, a non-transitory computer-readable medium may store one or more instructions for wireless communication. The one or more instructions, when executed by one or more processors of UE, may cause the one or more processors to transmit a sidelink communication on a sidelink between the UE and another UE. The one or more instructions, when executed by one or more processors of UE, may cause the one or more processors to receive, on the sidelink, one or more feedback communications associated with the sidelink communication in a reporting period configured to occupy an entire bandwidth of a resource pool configured for the sidelink.

In some aspects, an apparatus for wireless communication may include means for transmitting a sidelink communication on a sidelink between the apparatus and another apparatus. The apparatus may include means for receiving, on the sidelink, one or more feedback communications associated with the sidelink communication in a reporting period configured to occupy an entire bandwidth of a resource pool configured for the sidelink.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
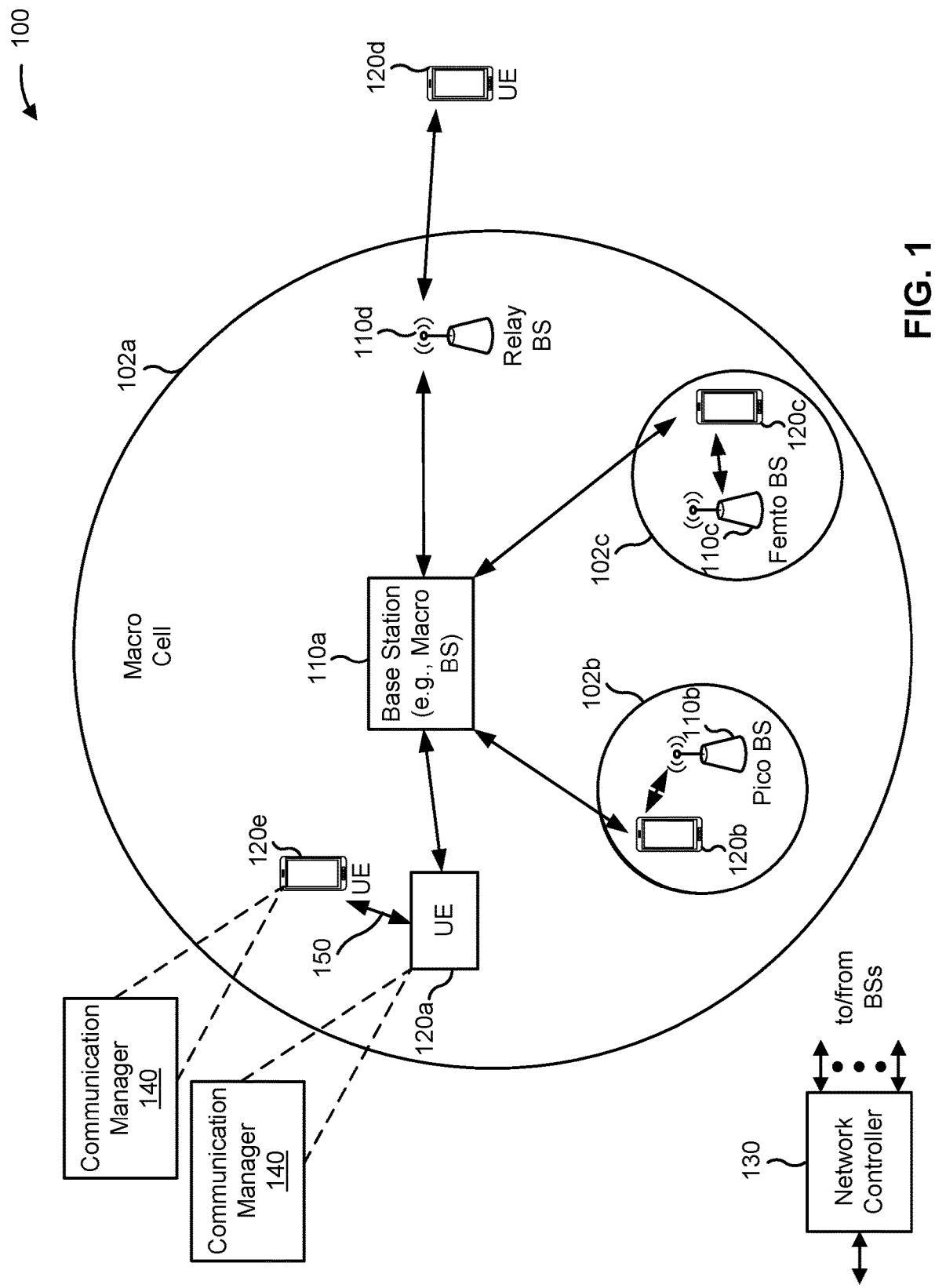
FIG. 1 is a block diagram conceptually illustrating an example of a wireless communication network, in accordance with various aspects of the present disclosure.

In some cases, two or more subordinate entities (e.g., UEs) may communicate with each other using sidelink signals. Real-world applications of such sidelink communications may include public safety, proximity services, UE-to-network relaying, vehicle-to-everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which may use an unlicensed spectrum).

In some cases, a UE may provide feedback for a communication that was received from another UE on a sidelink. The UE may transmit the feedback in one or more feedback communications. The one or more feedback communications may be transmitted in one or more feedback reporting symbols included in a frame structure for the sidelink. In some cases, the frame structure for the sidelink may include the feedback reporting symbols in each slot in the frame structure. However, the UE may not need to provide feedback in every slot in the frame structure. As a result, there may be unused (and therefore wasted) symbols in each slot. These unused symbols reduce the efficiency of the frame structure, for example, because they may be repurposed for other uses.

Moreover, the feedback reporting symbols may be bound by additional symbols for reception (Rx) to transmission (Tx) turnaround and vice-versa. Since the sidelink may be half-duplex, the UE may need one or more turnaround symbols to transition from Rx mode to Tx mode to transmit the one or more communications, and then from Tx mode back to Rx mode after the transmission is complete. The addition of these turnaround symbols in each slot in the frame structure can significantly increase the overhead of feedback reporting on the sidelink if every slot in the frame structure includes one or more symbols for reporting the feedback.

In other cases, feedback reporting symbols may be configured or scheduled on an ad-hoc basis. For example, the UE may receive a communication in a first slot and may transmit feedback for the communication in feedback reporting symbols in second slot that occurs at a pre-configured offset from the first slot (e.g., particular quantity of slots from the first slot). However, the feedback reporting symbols may overlap with other transmissions in the second slot, which may cause automatic gain control settling issues. For example, the other transmissions in the second slot may commence with settled automatic gain control parameters. When the UE transmits the feedback in the feedback reporting symbols in the second slot, and the transmission of the feedback overlaps with the other transmissions in the second slot, the overlap can cause an increase in transmit power in the second slot. The automatic gain control parameters may no longer be accurate for the other transmissions as a result of the increase in transmit power, which can cause the other transmissions to be corrupted.

Some aspects described herein provide techniques and apparatuses for feedback for sidelink communication. In some aspects, a UE may receive a sidelink communication on a sidelink between the UE and another UE. The UE may transmit, on the sidelink, one or more feedback communications associated with the sidelink communication in a reporting period. In one or more examples, the reporting period may be configured such that one or more feedback reporting symbols, for transmission of the one or more feedback communications, are included only in a subset of slots included in the frame structure of the sidelink as opposed to every slot. The reporting period may have a configurable periodicity (e.g., by the UE, by a base station, by another entity and/or the like) such that the reporting period may be configured to have a single-slot periodicity (e.g., where the reporting period occurs every slot included in the frame structure) or a multi-slot periodicity (e.g., where the reporting period spans multiple slots such that feedback reporting symbols in the feedback reporting period occur in a subset of slots included in the frame structure as opposed to every slot). In this way, the overhead consumed by feedback reporting on the sidelink and/or the quantity of unused feedback reporting symbols may be reduced if the reporting period is configured with a multi-slot periodicity, which in turn may increase the efficiency of the frame structure.

The reporting period and corresponding feedback resources may be configured in all the UEs, and thus may be system wide. Moreover, the reporting period (e.g., the feedback reporting symbols in the reporting period) may be configured to occupy the entire bandwidth of the resource pool of the sidelink. In this way, other transmitters (e.g., other UEs) may create a gap in their transmission during the reporting period (e.g., the feedback reporting symbols in the reporting period) to reduce or prevent overlap of feedback transmissions with other types of transmissions. The reduced overlap of feedback transmissions reduces automatic gain control settling issues, reduces the likelihood that transmissions will be corrupted, and/or the like.

Feedback communications may be transmitted in one or more resource blocks, of the one or more feedback reporting symbols, based at least in part on when transmission of the corresponding sidelink communication completed. To allow distinction of feedback, different transmission frequency division multiplexing (FDM) approaches can be adopted, which ensures that a deterministic relationship between transmission and corresponding feedback is present. There can be different types of feedback e.g. hybrid automatic repeat request (HARQ) feedback, channel state information (CSI) feedback, and/or the like. In some aspects, different reporting periods may be configured for different types of feedback. For example, different reporting periods may be configured for HARQ feedback and CSI feedback.

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120e, and/or the like) may be dispersed throughout wireless network 100, and each UE may be stationary or mobile. A UE may communicate with one or more BSs in wireless network 100, may communicate directly with another UE (e.g., UE 120a and UE 120e, as illustrated in FIG. 1) via a sidelink, and/or the like.

A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered as machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered as Internet-of-Things (IoT) devices, and/or may be implemented as NB-IoT (narrowband internet of things) devices. Some UEs may be considered as a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may receive a sidelink communication on a sidelink between the UE 120 and another UE 120, may transmit, on the sidelink, one or more feedback communications associated with the sidelink communication in a reporting period having a configurable periodicity, and/or the like. As described in more detail elsewhere herein, the communication manager 140 may receive a sidelink communication on a sidelink between the UE 120 and another UE 120, may transmit, on the sidelink, one or more feedback communications associated with the sidelink communication in a reporting period configured to occupy an entire bandwidth of a resource pool configured for the sidelink, and/or the like. As described in more detail elsewhere herein, the communication manager 140 may transmit a sidelink communication on a sidelink between the UE 120 and another UE 120, may receive, on the sidelink, one or more feedback communications associated with the sidelink communication in a reporting period having a configurable periodicity, and/or the like. As described in more detail elsewhere herein, the communication manager 140 may transmit a sidelink communication on a sidelink between the UE 120 and another UE 120, may receive, on the sidelink, one or more feedback communications associated with the sidelink communication in a reporting period configured to occupy an entire bandwidth of a resource pool configured for the sidelink, and/or the like. Additionally, or alternatively, the communication manager 140 may perform one or more other operations described herein.

As indicated above, FIG. 1 is provided merely as an example. Other examples may differ from what is described with regard to FIG. 1.

Figure 2:
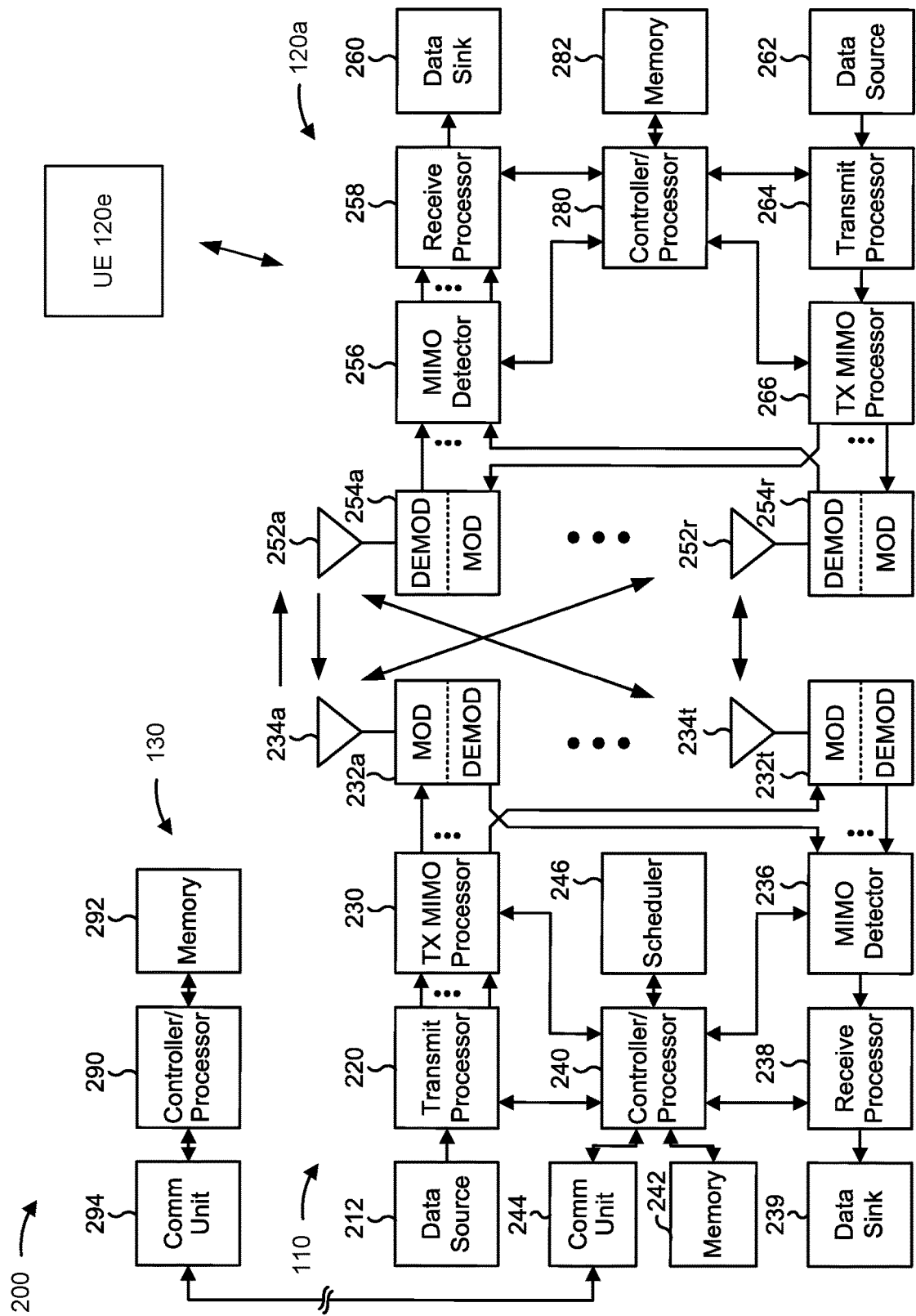
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120a and/or a UE 120e, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 (e.g., 232a through 232t) may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120a and/or UE 120e, antennas 252a through 252r may receive the downlink signals from base station 110 and/or other base stations, may receive sidelink signals from another UE 120 (e.g., UE 120a may receive sidelink signals from UE 120e and/or vice-versa) and may provide received signals to demodulators (DEMODs) 254a through 254r, respectively. Each demodulator 254 (e.g., 254a through 254r) may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120a and/or UE 120e to a data sink 260, and provide decoded control information and system information to a controller/processor 280. A channel processor may identify reference signal received power (RSRP), received signal strength indicator (RSSI), reference signal received quality (RSRQ), channel quality indicator (CQI), and/or the like. In some aspects, one or more components of UE 120a and/or UE 120e may be included in a housing.

On the uplink or a sidelink, at UE 120a and/or UE 120e, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110 on the uplink and/or to another UE 120 on the sidelink. At base station 110, the uplink signals from UE 120a, UE 120e, and other UEs may be received by antennas 234 (e.g., 234a through 234t), processed by demodulators 232, detected by a MIMO detector 236 if applicable, and further processed by a receive processor 238 to obtain decoded data and control information sent by UE 120a and/or UE 120e. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120a and/or UE 120e, and/or any other component(s) of FIG. 2 may perform one or more techniques associated with feedback for sidelink communications, as described in more detail elsewhere herein. For example, controller/processor 240 of base station 110, controller/processor 280 of UE 120a and/or UE 120e, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120a and/or UE 120e, respectively. A scheduler 246 may schedule UEs for data transmission on the downlink and/or uplink.

In some aspects, a UE 120 (e.g., UE 120a and/or UE 120e) may include means for receiving a sidelink communication on a sidelink between the UE 120 and another UE 120, means for transmitting, on the sidelink, one or more feedback communications associated with the sidelink communication in a reporting period having a configurable periodicity, and/or the like. In some aspects, a UE 120 (e.g., UE 120a and/or UE 120e) may include means for receiving a sidelink communication on a sidelink between the UE 120 and another UE 120, means for transmitting, on the sidelink, one or more feedback communications associated with the sidelink communication in a reporting period configured to occupy an entire bandwidth of a resource pool configured for the sidelink, and/or the like. In some aspects, a UE 120 (e.g., UE 120a and/or UE 120e) may include means for transmitting a sidelink communication on a sidelink between the UE 120 and another UE 120, means for receiving, on the sidelink, one or more feedback communications associated with the sidelink communication in a reporting period having a configurable periodicity, and/or the like. In some aspects, a UE 120 (e.g., UE 120a and/or UE 120e) may include means for transmitting a sidelink communication on a sidelink between the UE 120 and another UE 120, means for receiving, on the sidelink, one or more feedback communications associated with the sidelink communication in a reporting period configured to occupy an entire bandwidth of a resource pool configured for the sidelink, and/or the like. Additionally, or alternatively, a UE 120 may include means for performing one or more other operations described herein. In some aspects, such means may include the communication manager 140. Additionally, or alternatively, such means may include one or more components of UE 120a and/or UE 120e described in connection with FIG. 2.

As indicated above, FIG. 2 is provided merely as an example. Other examples may differ from what is described with regard to FIG. 2.

Figure 3:
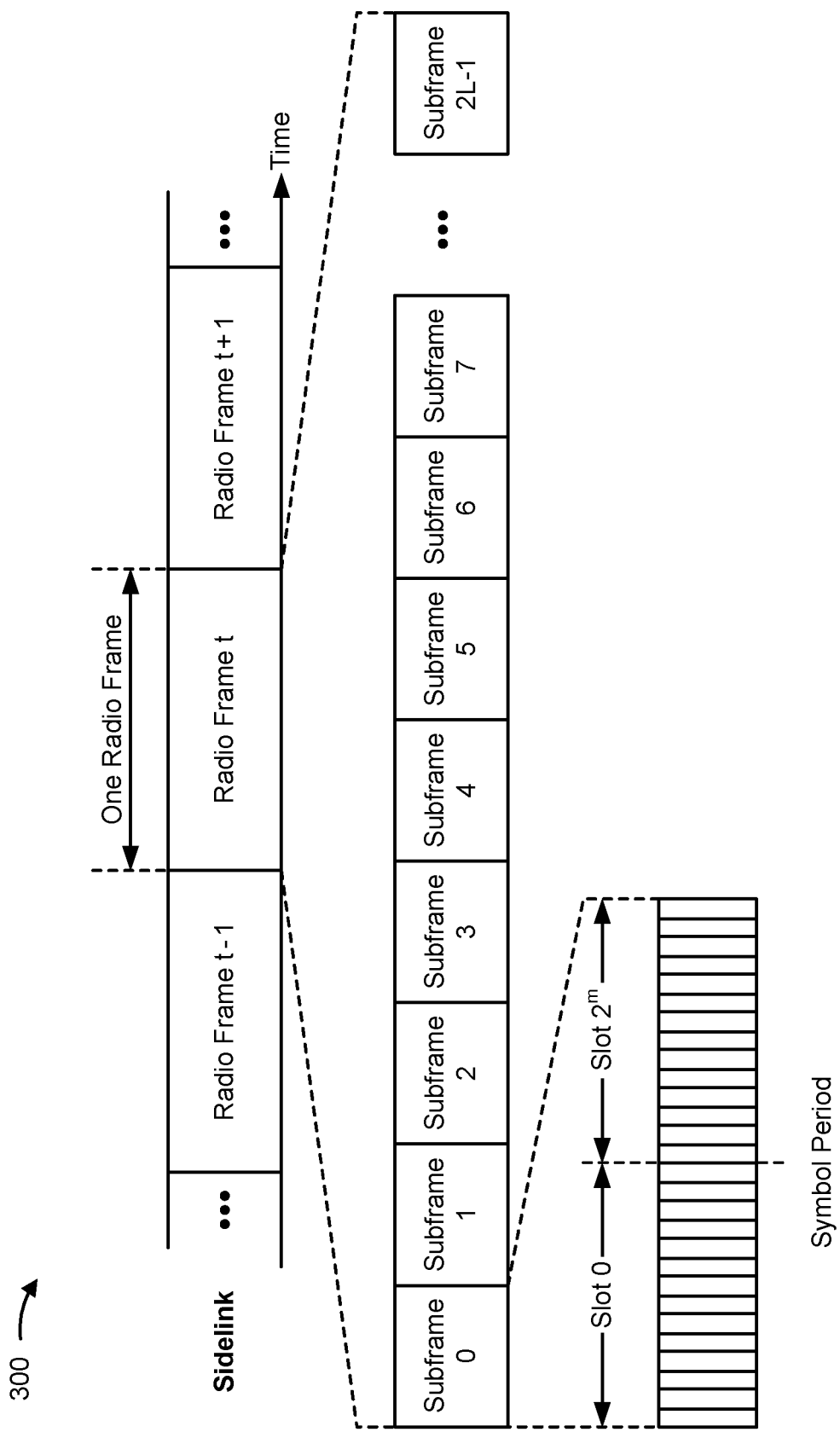
FIG. 3 is a block diagram conceptually illustrating an example of a frame structure in a wireless communication network, in accordance with various aspects of the present disclosure.

FIG. 3 shows an example frame structure 300 for frequency division duplexing (FDD), on a sidelink between UEs, in a telecommunications system (e.g., LTE, 5G NR, and/or the like). The transmission timeline for the sidelink may be partitioned into units of radio frames, where t represents time. Each radio frame may have a predetermined duration (e.g., 10 milliseconds (ms)) and may be partitioned into a plurality of subframes with indices of 0 through 2L−1. Each subframe may include two slots. As an example, each radio frame may be partitioned into 10 subframes 0 through 9 and 20 slots with indices of 0 through 19. Each slot may include a plurality of symbol periods, such as seven symbol periods for a normal cyclic prefix or six symbol periods for an extended cyclic prefix.

In some aspects, a UE (e.g., UE 120a, UE 120e, and/or the like) may transmit, to another UE (e.g., UE 120a, UE 120e, and/or the like) on a sidelink, one or more sidelink communications in a transmission period, which may include one or more slots included in frame structure 300. In some aspects, the other UE may receive the one or more sidelink communications, may generate feedback for the one or more sidelink communications, may incorporate the feedback into one or more feedback communications, and may transmit, to the UE on the sidelink, the one or more feedback communications in one or more symbols and/or slots included in a reporting period, in frame structure 300, configured for the sidelink.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

As indicated above, FIG. 3 is provided merely as an example. Other examples may differ from what is described with regard to FIG. 3.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

FIGS. 4A-4D are diagrams illustrating one or more examples 400 of feedback for sidelink communications, in accordance with various aspects of the present disclosure. As shown in FIGS. 4A-4D, example(s) 400 may include communication between UE 120a and UE 120e, UE 120a and UE 120e may be included in a wireless network (e.g., wireless network 100) and may communicate via a sidelink. In some aspects, the sidelink may be configured with a frame structure, such as frame structure 300 of FIG. 3 and/or another sidelink frame structure.

Figure 4A:
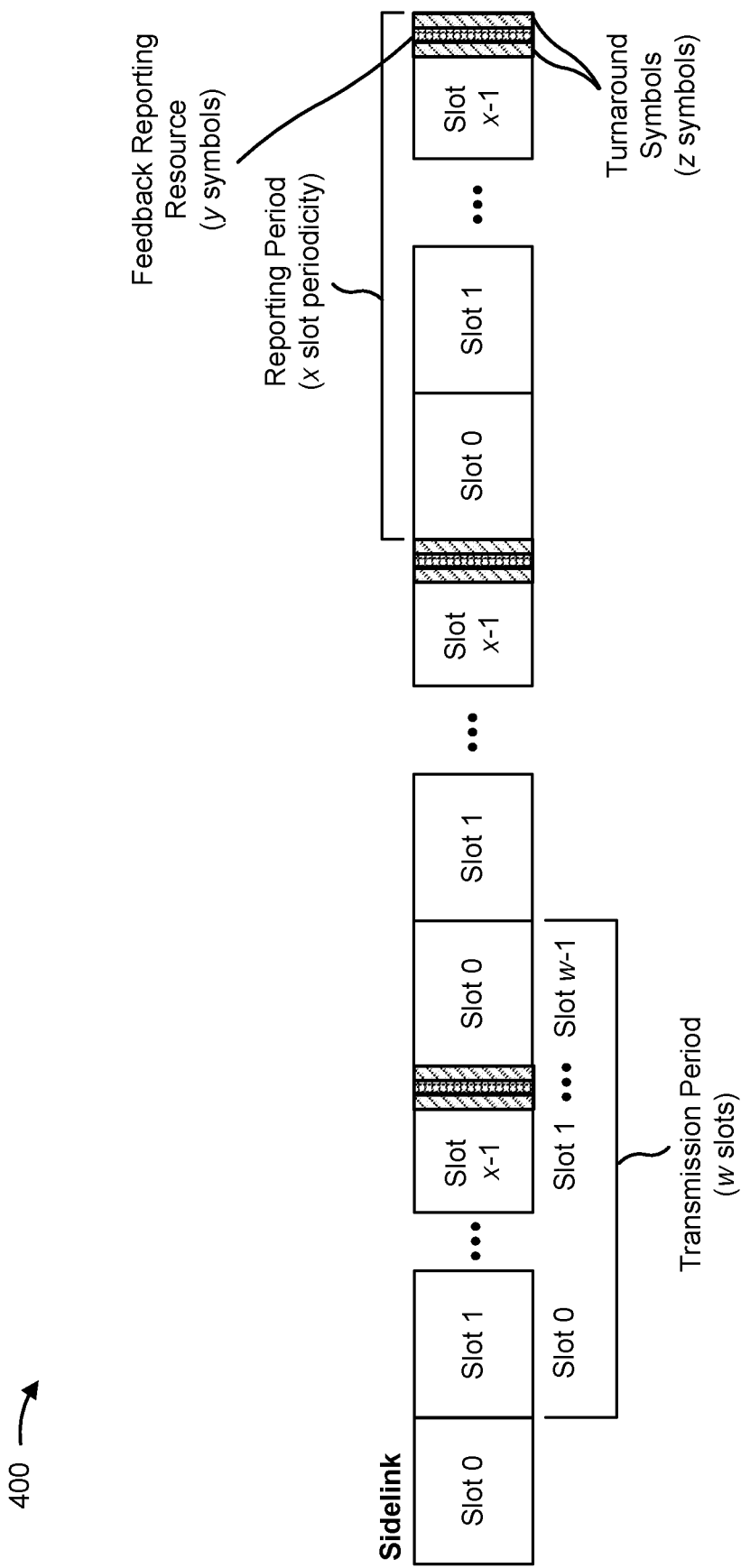
FIGS. 4A-4D are diagrams illustrating one or more examples of feedback for sidelink communications, in accordance with various aspects of the present disclosure.

In some aspects, the frame structure of the sidelink may include a plurality of transmission periods. As shown in FIG. 4A, a transmission period may include w slots. The w slots may include slot 0 through slot w−1, which may be one slot or a plurality of slots. UE 120a may transmit, to UE 120e, one or more sidelink communications, in the one or more slots included in a transmission period, and/or vice-versa. The quantity of the w slots included in a transmission period may be configurable by a BS included in the wireless network, by a network function device included in the wireless network, by a network operator of the wireless network, and/or the like. For example, the quantity of the w slots may be configured for the entire wireless network, may be configured for a particular UE, may be configured for a particular set of UEs, and/or the like. In some aspects, a transmission period may include a single slot (e.g., w=1 slot). In some aspects, a transmission period may be a multi-slot transmission period that includes a plurality of slots (e.g., w>1 slot).

In some aspects, the frame structure of the sidelink may include a plurality of feedback reporting periods. As shown in FIG. 4A, a feedback reporting period may include x slots (e.g., slot 0 through slot x−1). The quantity of the x slots included in a feedback reporting period may be configurable by a BS included in the wireless network, by a network function device included in the wireless network, by a network operator of the wireless network, and/or the like. For example, the quantity of the x slots may be configured for the entire wireless network, may be configured for a particular UE, may be configured for a particular set of UEs, and/or the like. In some aspects, x may be the same quantity of slots as w. In some aspects, x and w may be different quantities of slots.

In some aspects, the feedback reporting period may have a single-slot periodicity (e.g., x=1 slot). In some aspects, the feedback reporting period may have a multi-slot periodicity. In this case, the feedback reporting period may have length of x slots, where x>1 slot, such that each feedback reporting period may include one feedback reporting resource that occurs every x slots. UE 120a and/or UE 120e may transmit, in a feedback reporting resource in a feedback reporting period, one or more feedback communications that include feedback for all or a subset of sidelink communications that complete transmission in a corresponding transmission period. In some aspects, feedback communications that are to be transmitted by a plurality of UEs in a particular feedback reporting period may be multiplexed together in the feedback reporting period. For example, the feedback communications may be time division multiplexed, frequency division multiplexed, and/or the like in a feedback reporting resource in the feedback reporting period.

In some aspects, a transmission period and corresponding feedback reporting period may be located in adjacent sets of slots in the frame structure. For example, a transmission period may include a first set of three contiguous slots, and a corresponding feedback reporting period may include a second set of three contiguous slots that commences directly after the completion of the first set of three contiguous slots. In some aspects, a transmission period and corresponding feedback reporting period may be separated by one or more intervening slots. For example, and as illustrated in example 400 in FIG. 4A, a transmission period may include a first set of w contiguous slots, a corresponding feedback reporting period may include a set of x contiguous slots, and the set of w slots and the set of x slots may be separated by a plurality of intervening slots.

A feedback reporting resource in a feedback reporting period may include y feedback reporting symbols (e.g., one or more contiguous and/or adjacent symbols) included in a single slot (or subset of slots) of the x slots included in the feedback reporting period. In some aspects, they feedback reporting symbols may include one or more symbols, one or more portions of one or more symbols (e.g., one or more half symbols, a 10 μs portion of one or more symbols, one or more resource blocks (RBs) of the one or more symbols, and/or the like) that are located at or near an end of a particular slot included in the feedback reporting period (e.g., a first slot included in the feedback reporting period, a last slot included in the feedback reporting period, or another slot included in the feedback reporting period). In some aspects, they feedback reporting symbols may include one or more symbols that are located at or near a beginning of a particular slot included in the feedback reporting period. In some aspects, they feedback reporting symbols may include one or more symbols that are located in another location in a slot included in the feedback reporting period.

In some aspects, z turnaround symbols may be located adjacent to the y feedback reporting symbols. For example, one or more turnaround symbols may be located before they feedback reporting symbols, and one or more turnaround symbols may be located after they feedback reporting symbols. In this way, if a UE that is to transmit the one or more feedback communications is receiving sidelink communications in the slot that includes they feedback reporting symbols, the z turnaround symbols provide the UE with a timing buffer to transition from receiving mode to transition mode in order to transmit the one or more communications, and back into receiving mode in order to continue receiving the sidelink communications. The turnaround symbols may also be referred to as transmit-receive symbols, transmit-receive time, transmit-receive turnaround symbols, and/or the like.

The one or more feedback communications, that are to be transmitted in a feedback reporting period, may include various types of feedback communications. For example, the one or more feedback communications may include one or more hybrid automatic repeat request (HARQ) communications that are transmitted in a physical sidelink feedback channel (PSFCH), one or more reference signal feedback communications that are to be transmitted in PSFCHs (e.g., a channel state information (CSI) feedback communication associated with a CSI reference signal (CSI-RS), a demodulation reference signal (DMRS) feedback communication, and/or the like), and/or the like.

In some aspects, a UE may transmit different types of feedback communications in the same feedback reporting period. For example, the UE may transmit a first type of feedback communication in one or more feedback symbols of the y feedback reporting symbols, may transmit a second type of feedback communication in one or more other feedback symbols of they feedback reporting symbols, and so on. As another example, the UE may frequency division multiplex (FDM) the first type of feedback communication and the second type of feedback communication in they feedback reporting symbols.

In some aspects, a UE may transmit different types of feedback communications in different feedback reporting periods. In this case, the UE may transmit a first type of feedback communication in a first feedback reporting period, may transmit a second type of feedback communication in a second feedback reporting period, and so on.

In some aspects, different feedback transmission periods may be configured for the transmission of different feedback communication types or different combinations of feedback communication types. In this way, a periodicity for transmitting a particular feedback communication type may be different from a periodicity for transmitting another feedback communication type. For example, a subset of feedback reporting periods may be configured for transmitting HARQ communications, while another subset of feedback reporting periods may be configured for transmitting HARQ communications and CSI feedback communications. This may result in the periodicity for transmitting HARQ communications being shorter relative to the periodicity for transmitting HARQ communications and CSI feedback communications.

If a feedback reporting period configured for the transmission of HARQ communications occurs earlier in time relative to a feedback reporting period that is configured for the transmission of HARQ communications and CSI feedback communications, a UE may transmit a HARQ communication in the feedback reporting period configured for the transmission of HARQ communications, and may transmit a CSI feedback communication in the feedback reporting period that is configured for the transmission of HARQ communications and CSI feedback communications, or the UE may refrain from transmitting the HARQ communication in the feedback reporting period configured for the transmission of HARQ communications and may transmit both the HARQ communication and the CSI feedback communication in the feedback reporting period that is configured for the transmission of HARQ communications and CSI feedback communications.

Figure 4B:
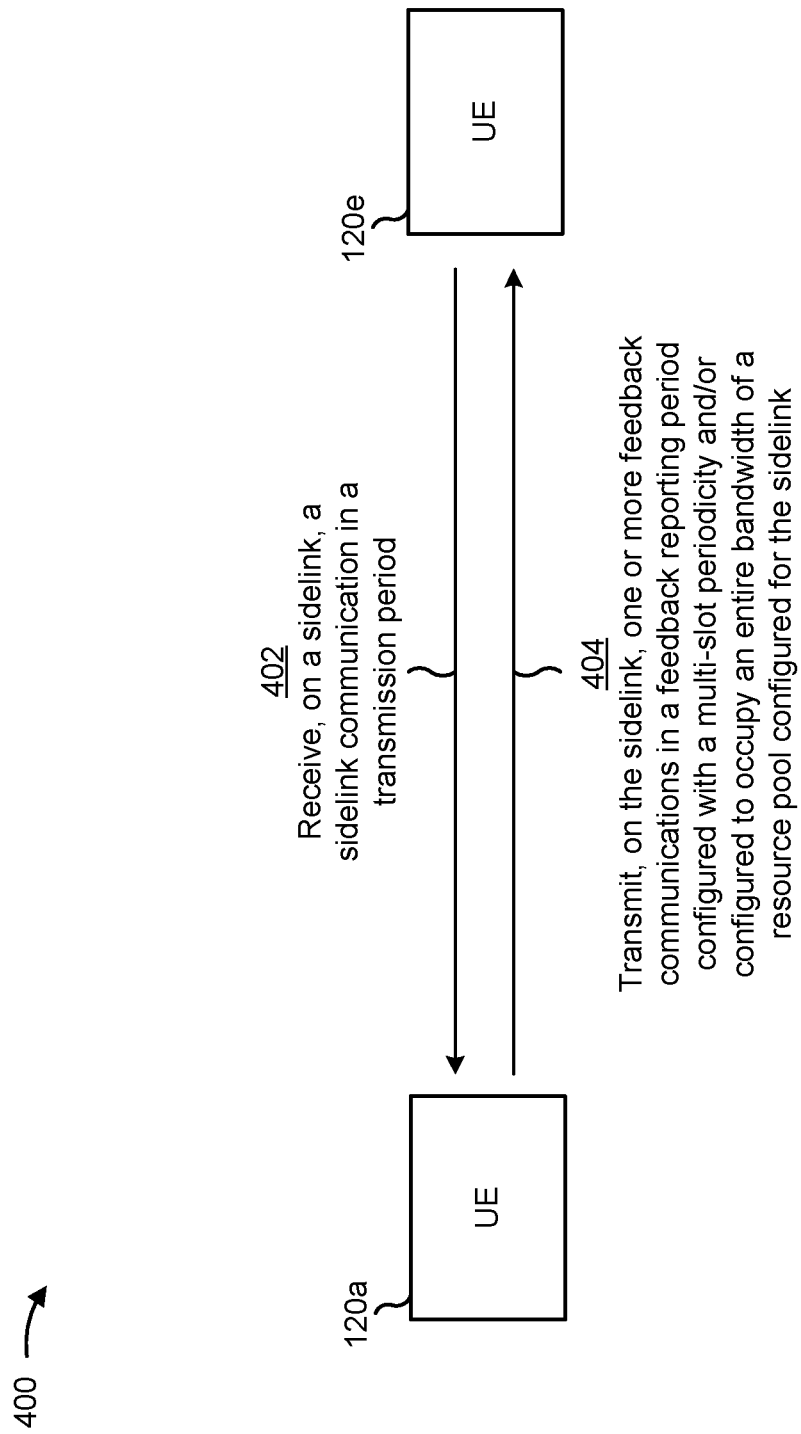
Figure 4C:
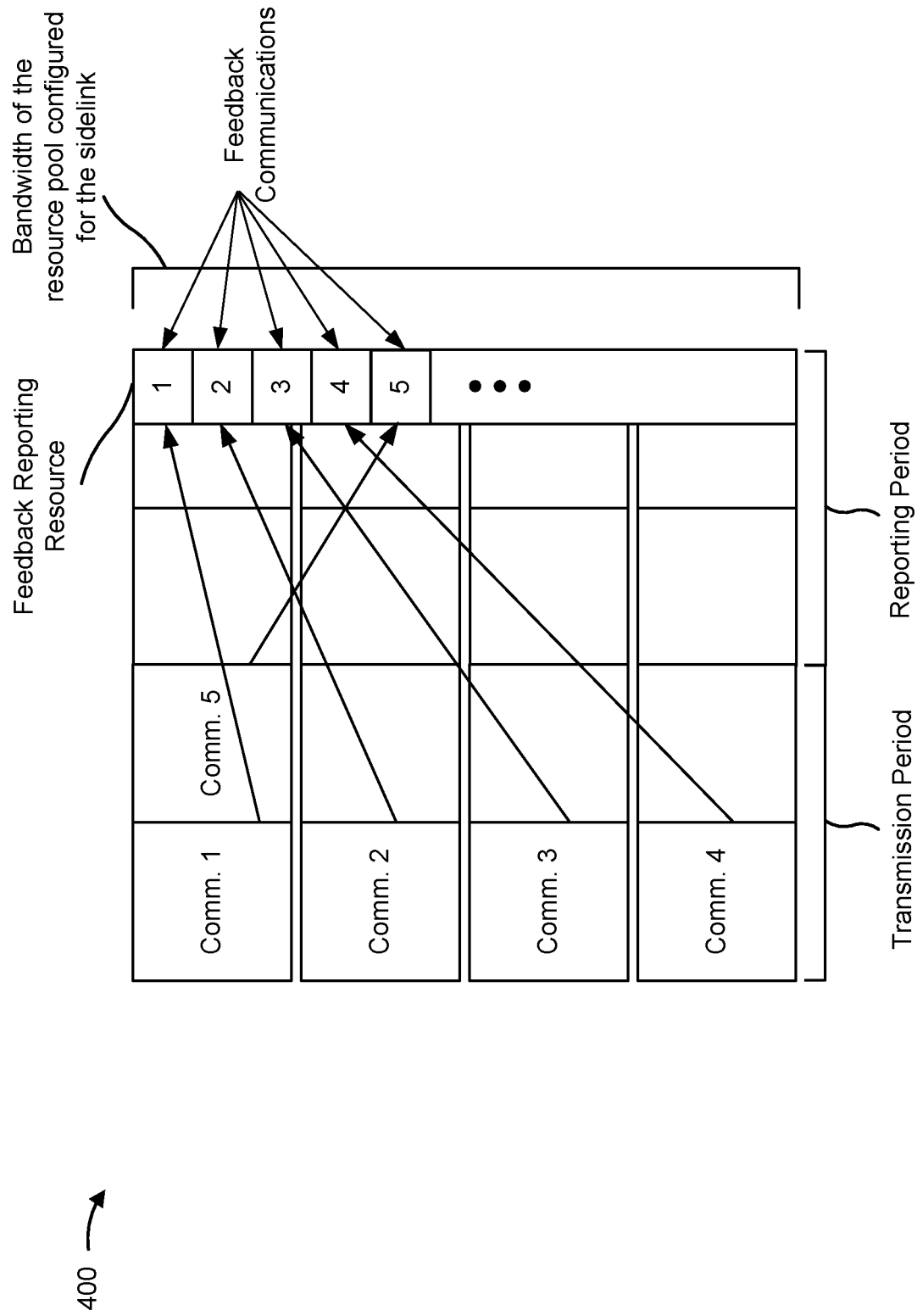
Figure 4D:
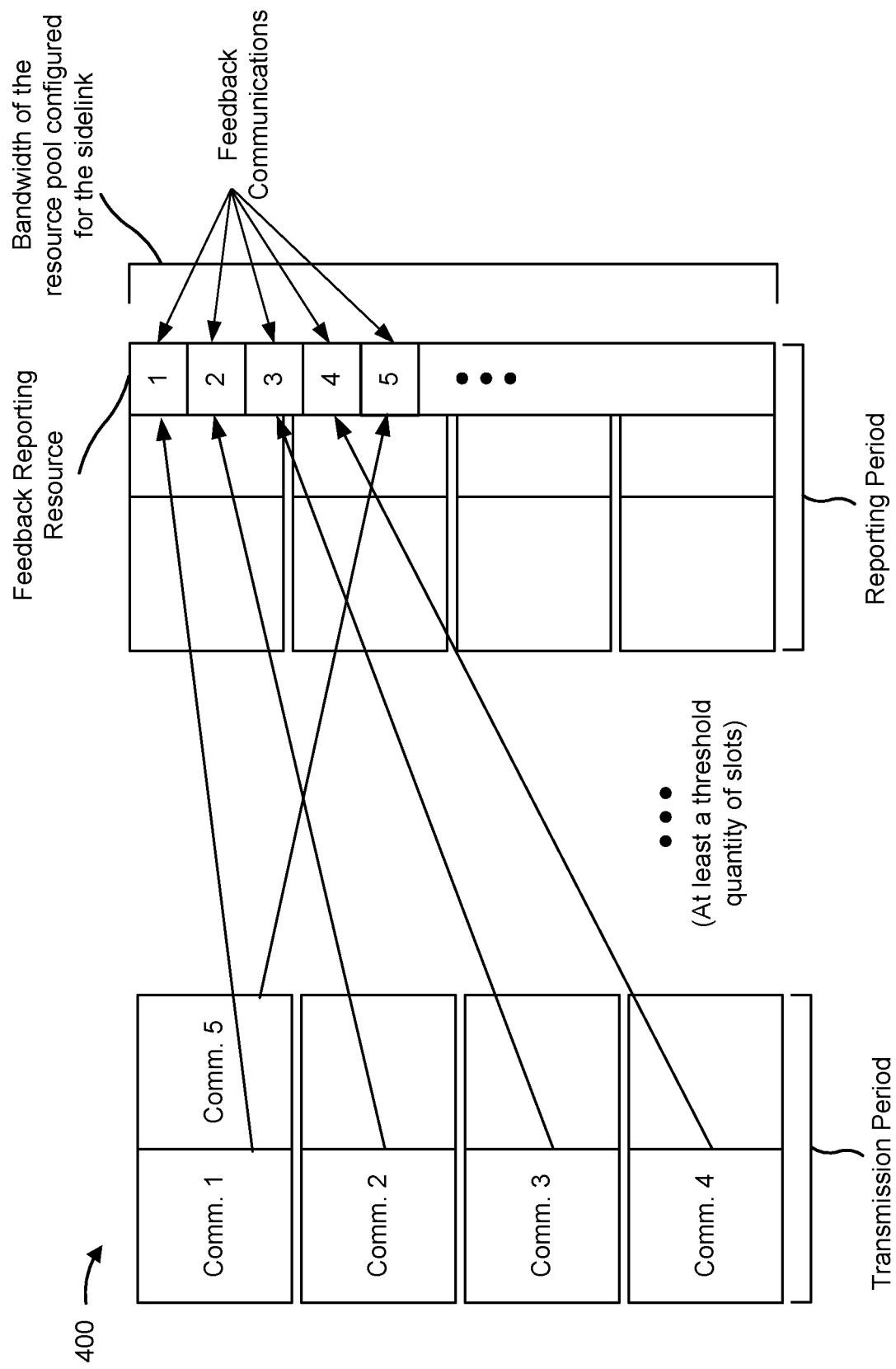

FIGS. 4B-4D illustrate examples of UE 120a and UE 120e performing sidelink communications based at least in part on the frame structure (or similar frame structure) 400 illustrated in FIG. 4A. As shown by reference number 402 in FIG. 4B and by FIG. 4C, UE 120a may receive, from UE 120e, a sidelink communication in a transmission period on the sidelink. The sidelink communication may include a physical sidelink shared channel (PSSCH) communication, a physical sidelink control channel (PSCCH) communication, or another type of sidelink communication. As shown by reference number 404 in FIG. 4B, UE 120a may receive the sidelink communication and may transmit, to UE 120e, one or more feedback communications associated with the sidelink communication. UE 120a may transmit the one or more feedback communications on a PSFCH of the sidelink and in a feedback reporting period associated with the transmission period. In particular, UE 120 may transmit the one or more feedback communications in a feedback reporting resource in the feedback reporting period.

In some aspects, the feedback reporting period may have a single-slot periodicity (in which case, the feedback reporting resource may occur every slot) or may have a multi-slot periodicity (in which case, the feedback reporting resource may occur at a periodicity of every two or more slots). In some aspects, the feedback reporting period may have a configurable periodicity such that the feedback reporting resource may be switched between occurring every slot and occurring every two or more slots. In this case, a base station (e.g., a serving base station 110 of UE 120a or another base station 110) may configure the periodicity of the feedback reporting period to be one slot, a plurality of slots, or the like. In some aspects, the base station may configure the periodicity of the feedback reporting period dynamically (e.g., via downlink control information (DCI) signaling) or semi-statically (e.g., via medium access control control element (MAC-CE) signaling or radio resource control (RRC) signaling. Thus, UE 120a may identify the periodicity of the feedback reporting period based at least in part on signaling received from the base station. The signaling may identify the periodicity of the reporting period, may identify the time-domain resources that the feedback reporting period identifies, may identify the location of the feedback reporting resource within the feedback reporting period (e.g., may identify which slot in the feedback reporting period that the feedback reporting resource is included (which may be the first slot, the last slot, or another slot), may identify a location of the feedback reporting resource within the slot in which the feedback reporting resource is included, and/or the like. In this way, UE 120a may identify the feedback reporting period and/or the feedback reporting resource within the feedback reporting period based at least in part on the signaling received from the base station.

Moreover, and as shown in FIGS. 4C and 4D, the feedback reporting resource in the feedback reporting period may also be configured to occupy the entire bandwidth of the resource pool configured for the sidelink. The resource pool configured for the sidelink may be a bandwidth part configured for the sidelink, may include a subset of frequency domain resources (e.g., subcarriers, component carriers, subchannels, resource blocks, and/or the like) that are included in the entire frequency bandwidth allocated to UE 120a and/or UE 120e. In this case, the resource pool configured for the sidelink may include fewer frequency resources than the frequency resources available for an access link of UE 120a and/or UE 120e, such that the resource pool configured for the sidelink is narrower in frequency bandwidth relative to the access link. As an example, if the resource pool configured for the sidelink spans 100 resource blocks in bandwidth, the feedback reporting resource may also be configured to span the entire 100 resource blocks. In this way, the entire bandwidth of the resource pool configured for the sidelink is scheduled for feedback transmissions during the feedback reporting resource, which prevents other types of transmissions from occurring during the feedback reporting resource.

As further shown in FIGS. 4C and 4D, in some aspects, feedback communications (e.g., feedback communication 1 through feedback communication 5, and so on) may be frequency division multiplexed in the feedback reporting resource. The time location and/or frequency location of each feedback communication in the feedback reporting resource may be based at least in part on a slot and/or symbol in which the associated sidelink communications (e.g., comm. 1 through comm. 5, and so on) are received, may be based at least in part on a subchannel, subcarrier, or resource block in which the associated sidelink communications are received, and/or the like. In this case, each of the feedback communications may be transmitted across a subset of the resource blocks included in entire bandwidth of the resource pool configured for the sidelink. Thus, each of the feedback communications occupies less than the entire bandwidth of the resource pool configured for the sidelink. In some aspects, the combined bandwidth occupied by all of the feedback communications may be equal to or less than the resource pool configured for the sidelink. In some aspects, a single feedback communication may be configured to occupy the entire bandwidth of the resource pool configured for the sidelink. In some aspects, feedback communications may be time division multiplexed in the feedback reporting period (e.g., in the feedback reporting resource included in the feedback reporting period), where feedback communications are transmitted in adjacent symbols included in the feedback reporting period (e.g., in the feedback reporting resource included in the feedback reporting period).

In some aspects, UE 120e may identify the particular feedback reporting period, from a plurality of feedback reporting periods configured for the sidelink, as the reporting period that is adjacent to the transmission period in which the sidelink communication was received. For example, and as shown in FIG. 4C, if UE 120e is to transmit feedback for sidelink communication 5, UE 120e may identify the reporting period based at least in part on a starting slot of the reporting period being adjacent to a slot in which transmission of sidelink communication 5 completed or based at least in part on the starting slot of the reporting period being adjacent to an ending slot of the transmission period in which transmission of sidelink communication 5 completed.

In some aspects, UE 120e may identify the particular feedback reporting period, from a plurality of feedback reporting periods configured for the sidelink, as the reporting period that occurs at least a threshold quantity of slots after the transmission period in which the sidelink communication was received. For example, as shown in FIG. 4D, if UE 120e is to transmit feedback for sidelink communication 5, UE 120e may identify the reporting period based at least in part on a starting slot of the reporting period at least a threshold quantity of slots (e.g., one or more slots) after a slot in which transmission of sidelink communication 5 completed or based at least in part on the starting slot of the reporting period being at least a threshold quantity of slots (e.g., one or more slots) after an ending slot of the transmission period in which transmission of sidelink communication 5 completed.

In some aspects, UE 120*e* may identify the particular feedback reporting period, from a plurality of feedback reporting periods configured for the sidelink, based at least in part on various factors. In some aspects, UE 120*e* may identify the particular feedback reporting period based at least in part on a processing capability of UE 120*e*. For example, if UE 120*e* is capable of receiving the one or more sidelink communications, decoding the one or more sidelink communications, and transmitting the one or more feedback communications in the next occurring feedback reporting period, UE 120*e* may transmit the one or more feedback communications in the next scheduled feedback reporting period. Otherwise, UE 120*e* may transmit the one or more feedback communications in a subsequent feedback reporting period (e.g., a feedback reporting period that occurs at least an M-slot offset after the transmission period ends, where M is greater than or equal to the processing capability of UE 120*e* in slots) once the one or more feedback communications are ready to be transmitted.

In some aspects, UE 120*e* may identify the feedback reporting period based at least in part on one or more quality of service (QoS) parameters. For example, UE 120*e* may identify a feedback reporting period that satisfies a latency parameter for transmitting a HARQ communication, that satisfies a latency parameter for transmitting a CSI feedback communication, and/or the like. As another example, UE 120*e* may identify the feedback reporting period as the next scheduled feedback reporting period based at least in part on a priority parameter assigned to UE 120*e*, may identify the feedback reporting period as a subsequent feedback reporting period based at least in part on the priority parameter, assigned to UE 120*e*, being a lower priority relative to another UE that is to transmit one or more other feedback communications in the next scheduled feedback reporting period, and/or the like.

In this way, UE 120*e* may transmit the one or more feedback communications in they feedback reporting symbols included in a slot of the feedback reporting period. In this way, they feedback reporting symbols are included in a subset of slots included in the frame structure of the sidelink, as opposed to every slot such that the feedback reporting symbols (and/or an associated feedback reporting period) have a multi-slot periodicity, which reduces the overhead consumed by feedback reporting on the sidelink and reduces the quantity of unused feedback reporting symbols, which in turn increases the efficiency of the frame structure. Moreover, they feedback reporting symbols (and/or the associated feedback reporting period) may be configured to occupy the entire bandwidth of the resource pool configured for a sidelink on which the feedback communications are to be transmitted such that no other transmissions on the sidelink are to overlap with the feedback communications, which reduces automatic gain control issues, reduces the quantity of corrupted transmissions on the sidelink, and/or the like.

As indicated above, FIGS. 4A and 4B are provided as an example. Other examples may differ from what is described with respect to FIGS. 4A and 4B.

Figure 5:
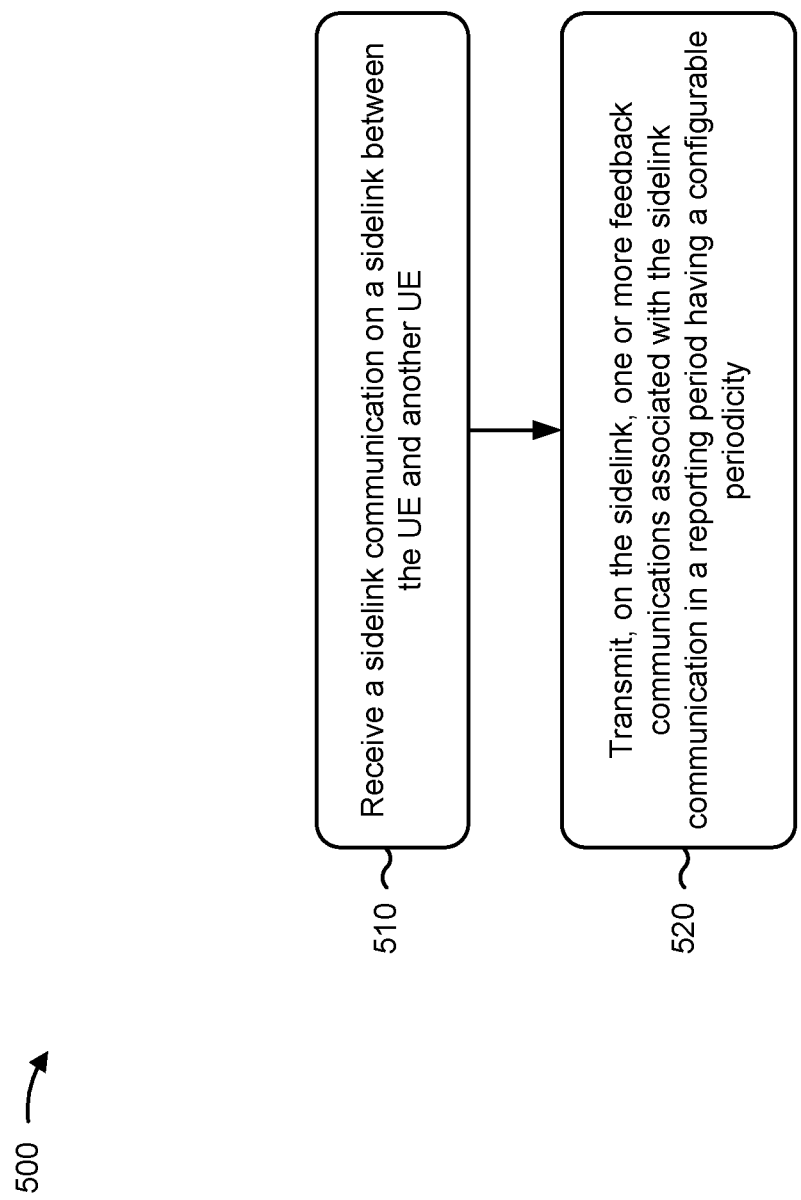
FIGS. 5-8 are diagrams illustrating one or more example processes performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120, UE 120*a*, UE 120*e*, and/or the like) performs operations associated with feedback for sidelink communications.

As shown in FIG. 5, in some aspects, process 500 may include receiving a sidelink communication on a sidelink between the UE and another UE (block 510). For example, the UE (e.g., using receive processor 258, transmit processor 264, controller/processor 280, memory 282, and/or the like) may receive a sidelink communication on a sidelink between the UE and another UE, as described above.

As further shown in FIG. 5, in some aspects, process 500 may include transmitting, on the sidelink, one or more feedback communications associated with the sidelink communication in a reporting period having a configurable periodicity (block 520). For example, the UE (e.g., using receive processor 258, transmit processor 264, controller/processor 280, memory 282, and/or the like) may transmit, on the sidelink, one or more feedback communications associated with the sidelink communication in a reporting period having a configurable periodicity, as described above.

Process 500 may include additional aspects, such as any single aspect or any combination of aspects described below and/or in connection with one or more other processes described elsewhere herein.

In a first aspect, the reporting period is configured with a periodicity comprising one or multiple slots. In a second aspect, alone or in combination with the first aspect, process 500 includes identifying the reporting period based at least in part on a starting slot of the reporting period being adjacent to a slot in which transmission of the sidelink communication completed. In a third aspect, alone or in combination with one or more of the first and second aspects, process 500 includes identifying the reporting period based at least in part on the reporting period occurring at least a threshold quantity of slots after a slot in which transmission of the sidelink communication completed.

In a fourth aspect, alone or in combination with one or more of the first through third aspects, transmitting the one or more feedback communications in the reporting period comprises transmitting the one or more feedback communications in one or more symbols included in the reporting period. In a fifth aspect, alone or in combination with one or more of the first through fourth aspects, the one or more symbols are adjacent symbols, and the reporting period comprises a first transmit-receive turnaround symbol adjacent to a first symbol of the one or more symbols and a second transmit-receive turnaround symbol adjacent to a second symbol of the one or more symbols.

In a sixth aspect, alone or in combination with one or more of the first through fifth aspects, process 500 includes identifying the reporting period based at least in part on a processing capability of the UE. In a seventh aspect, alone or in combination with one or more of the first through sixth aspects, process 500 includes identifying the reporting period based at least in part on a QoS level associated with the sidelink communication. In an eighth aspect, alone or in combination with one or more of the first through seventh aspects, the QoS level associated with the sidelink communication is based at least in part on a priority parameter associated with the sidelink communication, a latency parameter associated with the sidelink communication, or a combination of the priority parameter associated with the sidelink communication and the latency parameter associated with the sidelink communication.

In a ninth aspect, alone or in combination with one or more of the first through eighth aspects, transmitting the one or more feedback communications in the reporting period comprises transmitting the one or more feedback communications in a feedback reporting resource included in the reporting period. In a tenth aspect, alone or in combination with one or more of the first through ninth aspects, the one or more feedback communications comprise at least one of a HARQ communication that is transmitted in a PSFCH, a CSI feedback communication that is transmitted in another PSFCH, or a combination of the HARQ communication that is transmitted in the PSFCH and the CSI feedback communication that is transmitted in the other PSFCH.

In an eleventh aspect, alone or in combination with one or more of the first through tenth aspects, the one or more feedback communications are multiplexed into one or more symbols, included in the reporting period, with one or more other feedback communications that are transmitted by the other UE and the reporting period occupies an entire bandwidth of a resource pool configured for the sidelink such that no other transmissions, other than the one or more feedback communications and the one or more other feedback communications, occur in the one or more symbols.

In a twelfth aspect, alone or in combination with one or more of the first through eleventh aspects, the one or more feedback communications comprise a HARQ communication that is transmitted in a PSFCH, and a CSI feedback communication that is transmitted in another PSFCH, wherein the HARQ communication and the CSI feedback communication are time division multiplexed in the reporting period. In a thirteenth aspect, alone or in combination with one or more of the first through twelfth aspects, the one or more feedback communications comprise a HARQ communication that is transmitted in a PSFCH, and a CSI feedback communication that is transmitted in another PSFCH, wherein the HARQ communication and the CSI feedback communication are frequency division multiplexed in the reporting period.

In a fourteenth aspect, alone or in combination with one or more of the first through thirteenth aspects, the one or more feedback communications comprise a HARQ communication that is transmitted in a PSFCH, and a CSI feedback communication that is transmitted in another PSFCH. In a fifteenth aspect, alone or in combination with one or more of the first through fourteenth aspects, process 500 includes identifying the reporting period based at least in part on a periodicity of one or more slots, in a plurality of reporting periods, for transmitting HARQ communications and a periodicity of one or more slots, in the plurality of reporting periods, for transmitting CSI feedback communications.

In a sixteenth aspect, alone or in combination with one or more of the first through fifteenth aspects, the one or more feedback communications comprise a HARQ communication that is transmitted in a PSFCH. In a seventeenth aspect, alone or in combination with one or more of the first through sixteenth aspects, process 500 includes transmitting, in another reporting period, a CSI feedback communication, associated with the sidelink communication, in another PSFCH. In an eighteenth aspect, alone or in combination with one or more of the first through seventeenth aspects, receiving the sidelink communication comprises receiving a plurality of sidelink communications that were transmitted during a transmission period on the sidelink.

In a nineteenth aspect, alone or in combination with one or more of the first through eighteenth aspects, transmitting the one or more feedback communications comprises transmitting the one or more feedback communications, for the plurality of sidelink communications, during the reporting period. In a twentieth aspect, alone or in combination with one or more of the first through nineteenth aspects, receiving the sidelink communication comprises receiving a plurality of sidelink communications that were transmitted during a transmission period on the sidelink. In a twenty-first aspect, alone or in combination with one or more of the first through twentieth aspects, transmitting the one or more feedback communications comprises transmitting the one or more feedback communications, for a subset of the plurality of sidelink communications, during the reporting period.

In a twenty-second aspect, alone or in combination with one or more of the first through twenty-first aspects, the reporting period comprises a reporting period that occupies an entire bandwidth of a resource pool configured for the sidelink, a UE-specific reporting period, or a reporting period configured for a set of UEs. In a twenty-third aspect, alone or in combination with one or more of the first through twenty-second aspects, the reporting period is included in a plurality of reporting periods configured for the sidelink. In a twenty-fourth aspect, alone or in combination with one or more of the first through twenty-third aspects, transmitting the one or more feedback communications in the reporting period comprises transmitting the one or more feedback communications in one or more RBs of one or more symbols included in the reporting period, the one or more RBs being associated with a slot in which transmission of the sidelink communication completed.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
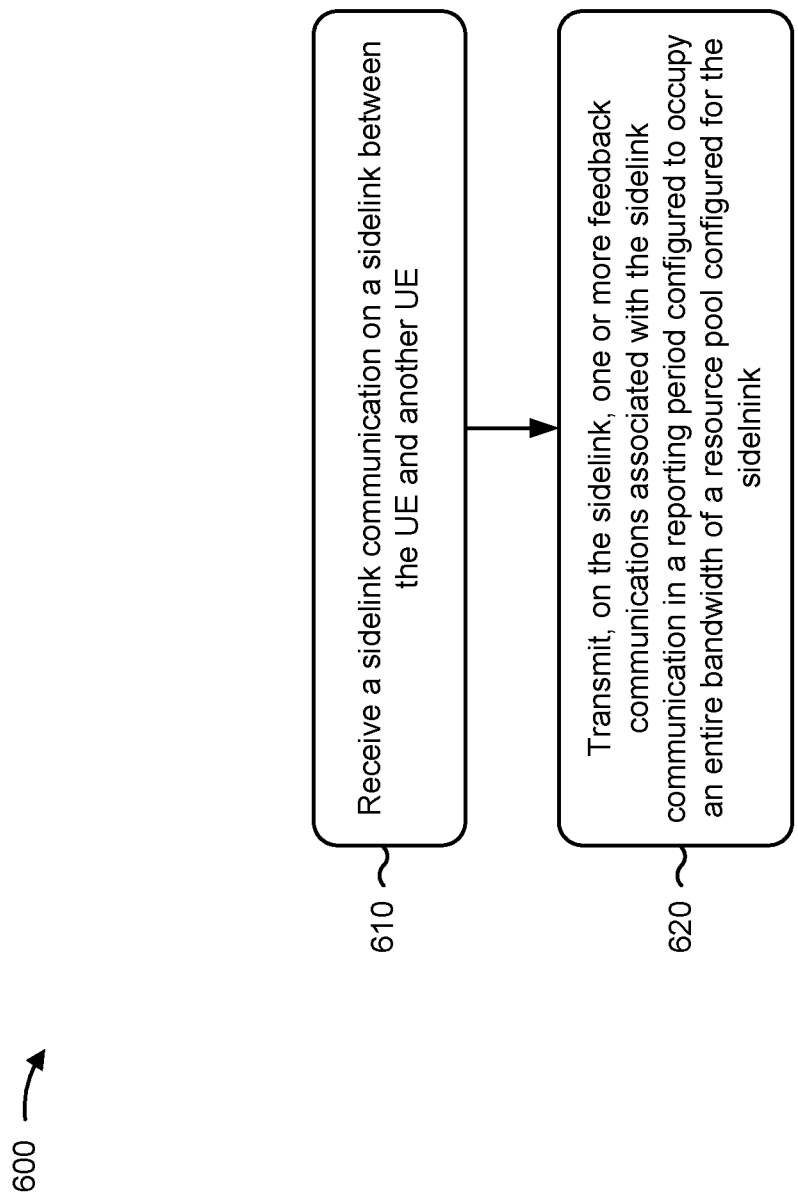

FIG. 6 is a diagram illustrating an example process 600 performed, for example, by a UE, in accordance with various aspects of the present disclosure. Example process 600 is an example where the UE (e.g., UE 120, UE 120a, UE 120e, and/or the like) performs operations associated with feedback for sidelink communications.

As shown in FIG. 6, in some aspects, process 600 may include receiving a sidelink communication on a sidelink between the UE and another UE (block 610). For example, the UE (e.g., using receive processor 258, transmit processor 264, controller/processor 280, memory 282, and/or the like) may receive a sidelink communication on a sidelink between the UE and another UE, as described above.

As further shown in FIG. 6, in some aspects, process 600 may include transmitting, on the sidelink, one or more feedback communications associated with the sidelink communication in a reporting period configured to occupy an entire bandwidth of a resource pool configured for the sidelink (block 620). For example, the UE (e.g., using receive processor 258, transmit processor 264, controller/processor 280, memory 282, and/or the like) may transmit, on the sidelink, one or more feedback communications associated with the sidelink communication in a reporting period configured to occupy an entire bandwidth of a resource pool configured for the sidelink, as described above.

Process 600 may include additional aspects, such as any single aspect or any combination of aspects described below and/or in connection with one or more other processes described elsewhere herein.

In a first aspect, the reporting period is configured with a periodicity comprising one or multiple slots. In a second aspect, alone or in combination with the first aspect, each of the one or more feedback communications occupies less than the entire bandwidth. In a third aspect, alone or in combination with one or more of the first and second aspects, transmitting the one or more feedback communications in the reporting period comprises transmitting the one or more feedback communications in one or more adjacent symbols included in the reporting period.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
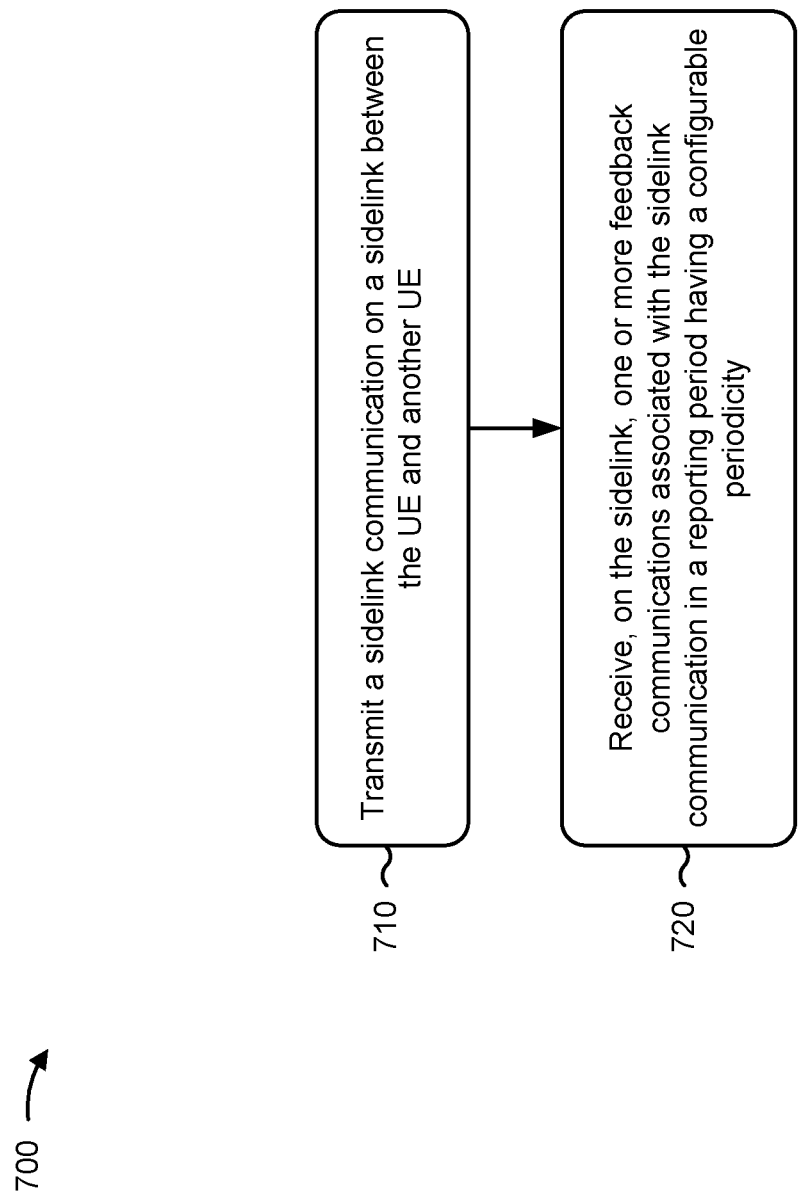

FIG. 7 is a diagram illustrating an example process 700 performed, for example, by a UE, in accordance with various aspects of the present disclosure. Example process 700 is an example where the UE (e.g., UE 120, UE 120a, UE 120e, and/or the like) performs operations associated with feedback for sidelink communications.

As shown in FIG. 7, in some aspects, process 700 may include transmitting a sidelink communication on a sidelink between the UE and another UE (block 710). For example, the UE (e.g., using receive processor 258, transmit processor 264, controller/processor 280, memory 282, and/or the like) may transmit a sidelink communication on a sidelink between the UE and another UE, as described above.

As further shown in FIG. 7, in some aspects, process 700 may include receiving, on the sidelink, one or more feedback communications associated with the sidelink communication in a reporting period having a configurable periodicity (block 720). For example, the UE (e.g., using receive processor 258, transmit processor 264, controller/processor 280, memory 282, and/or the like) may receive, on the sidelink, one or more feedback communications associated with the sidelink communication in a reporting period having a configurable periodicity, as described above.

Process 700 may include additional aspects, such as any single aspect or any combination of aspects described below and/or in connection with one or more other processes described elsewhere herein.

In a first aspect, the reporting period is configured with a multi-slot periodicity. In a second aspect, alone or in combination with the first aspect, process 700 includes identifying the reporting period based at least in part on a starting slot of the reporting period being adjacent to a slot in which transmission of the sidelink communication completed. In a third aspect, alone or in combination with one or more of the first and second aspects, process 700 includes identifying the reporting period based at least in part on the reporting period occurring at least a threshold quantity of slots after a slot in which transmission of the sidelink communication completed.

In a fourth aspect, alone or in combination with one or more of the first through third aspects, receiving the one or more feedback communications in the reporting period comprises receiving the one or more feedback communications in one or more symbols included in the reporting period. In a fifth aspect, alone or in combination with one or more of the first through fourth aspects, the one or more symbols are adjacent symbols and the reporting period comprises a first transmit-receive turnaround symbol adjacent to a first symbol of the one or more symbols and a second transmit-receive turnaround symbol adjacent to a second symbol of the one or more symbols.

In a sixth aspect, alone or in combination with one or more of the first through fifth aspects, process 700 includes identifying the reporting period based at least in part on a processing capability of the other UE. In a seventh aspect, alone or in combination with one or more of the first through sixth aspects, process 700 includes identifying the reporting period based at least in part on a QoS level associated with the sidelink communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
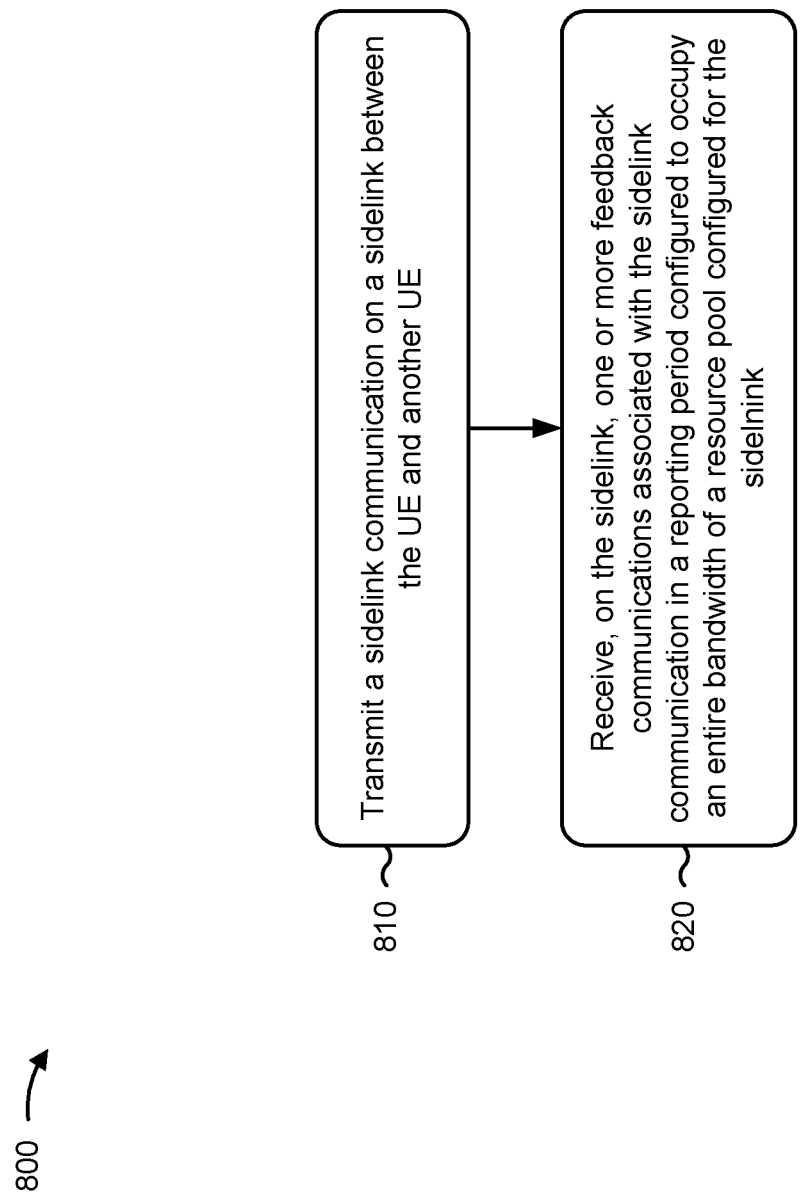

FIG. 8 is a diagram illustrating an example process 800 performed, for example, by a UE, in accordance with various aspects of the present disclosure. Example process 800 is an example where the UE (e.g., UE 120, UE 120a, UE 120e, and/or the like) performs operations associated with feedback for sidelink communications.

As shown in FIG. 8, in some aspects, process 800 may include transmitting a sidelink communication on a sidelink between the UE and another UE (block 810). For example, the UE (e.g., using receive processor 258, transmit processor 264, controller/processor 280, memory 282, and/or the like) may transmit a sidelink communication on a sidelink between the UE and another UE, as described above.

As further shown in FIG. 8, in some aspects, process 800 may include receiving, on the sidelink, one or more feedback communications associated with the sidelink communication in a reporting period configured to occupy an entire bandwidth of a resource pool configured for the sidelink (block 820). For example, the UE (e.g., using receive processor 258, transmit processor 264, controller/processor 280, memory 282, and/or the like) may receive, on the sidelink, one or more feedback communications associated with the sidelink communication in a reporting period configured to occupy an entire bandwidth of a resource pool configured for the sidelink, as described above.

Process 800 may include additional aspects, such as any single aspect or any combination of aspects described below and/or in connection with one or more other processes described elsewhere herein.

In a first aspect, the reporting period is configured with a periodicity comprising one or multiple slots. In a second aspect, alone or in combination with the first aspect, each of the one or more feedback communications occupies less than the entire bandwidth. In a third aspect, alone or in combination with one or more of the first and second aspects, receiving the one or more feedback communications in the reporting period comprises receiving the one or more feedback communications in one or more adjacent symbols included in the reporting period.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a sidelink communication on a sidelink between the UE and another UE;
   identifying a feedback reporting resource from a plurality of feedback reporting resources for the sidelink,
      wherein the plurality of feedback reporting resources are configured with a multi slot periodicity indicating that a period of the plurality of feedback reporting resources spans multiple slots in a resource pool for the sidelink; and
   transmitting, on the sidelink, one or more feedback communications associated with the sidelink communication in the feedback reporting resource,
      the one or more feedback communications being transmitted in a physical sidelink feedback channel (PSFCH) associated with the feedback reporting resource.

2. The method of claim 1, wherein identifying the feedback reporting resource comprises:
   identifying the feedback reporting resource based at least in part on a starting slot of the feedback reporting resource being adjacent to a slot in which transmission of the sidelink communication completed.

3. The method of claim 1, wherein identifying the feedback reporting resource comprises:
   identifying the feedback reporting resource based at least in part on the feedback reporting resource occurring at least a threshold quantity of slots after a slot in which transmission of the sidelink communication completed.

4. The method of claim 1, wherein transmitting the one or more feedback communications in the feedback reporting resource comprises:
   transmitting the one or more feedback communications in one or more symbols included in the feedback reporting resource.

5. The method of claim 1, wherein identifying the feedback reporting resource comprises:
   identifying the feedback reporting resource based at least in part on a processing capability of the UE.

6. The method of claim 1, wherein identifying the feedback reporting resource comprises:
   identifying the feedback reporting resource based at least in part on a quality of service (QoS) level associated with the sidelink communication.

7. The method of claim 6, wherein the QoS level associated with the sidelink communication is based at least in part on:
   a priority parameter associated with the sidelink communication,
   a latency parameter associated with the sidelink communication, or
   a combination of the priority parameter associated with the sidelink communication and the latency parameter associated with the sidelink communication.

8. The method of claim 1, wherein the one or more feedback communications comprise a hybrid automatic repeat request (HARQ) communication that is transmitted in the PSFCH.

9. The method of claim 1, wherein the one or more feedback communications are multiplexed into one or more symbols, included in the plurality of feedback reporting resources, with one or more other feedback communications that are transmitted by the other UE; and
   wherein the plurality of feedback reporting resources are configured to occupy an entire bandwidth of the resource pool for the sidelink such that no other transmissions, other than the one or more feedback communications and the one or more other feedback communications, occur in the one or more symbols.

10. The method of claim 1,
   wherein the one or more feedback communications comprises a hybrid automatic repeat request (HARQ) communication that is transmitted in the PFSCH,
   wherein the method further comprises:
      transmitting a channel state information (CSI) feedback communication in another PSFCH, and
   wherein the HARQ communication and the CSI feedback communication are time division multiplexed in the feedback reporting resource.

11. The method of claim 1, wherein transmitting the one or more feedback communications in the feedback reporting resource comprises:
   transmitting the one or more feedback communications in one or more resource blocks (RBs) of one or more symbols included in the feedback reporting resource, the one or more RBs being associated with a slot in which transmission of the sidelink communication completed.

12. The method of claim 1,
   wherein the plurality of feedback reporting resources are configured for each UE of a plurality of UEs, and wherein the plurality of UEs include the UE and the other UE.

13. The method of claim 1, wherein identifying the feedback reporting resource comprises:
identifying the feedback reporting resource based at least in part on the feedback reporting resource occurring at least a threshold quantity of slots after a last slot of the sidelink communication.

14. The method of claim 1, wherein transmitting the one or more feedback communications in the feedback reporting resource comprises:
transmitting the one or more feedback communications in symbols included in the feedback reporting resource.

15. The method of claim 1, wherein transmitting the one or more feedback communications in the feedback reporting resource comprises:
transmitting the one or more feedback communications in resource blocks (RBs) of symbols included in the feedback reporting resource,
the RBs being associated with a last slot of the sidelink communication.

16. A method of wireless communication performed by a user equipment (UE), comprising:
receiving a sidelink communication on a sidelink between the UE and another UE;
identifying a feedback reporting resource from a plurality of feedback reporting resources for the sidelink,
wherein the plurality of feedback reporting resources are configured to occupy an entire bandwidth of a resource pool configured for the sidelink; and
transmitting, on the sidelink, one or more feedback communications associated with the sidelink communication in the feedback reporting resource,
the one or more feedback communications being transmitted in a physical sidelink feedback channel (PSFCH) associated with the feedback reporting resource.

17. The method of claim 16, wherein the plurality of feedback reporting resources have a multi-slot periodicity.

18. The method of claim 16, wherein a feedback communication, of the one or more feedback communications, occupies less than the entire bandwidth.

19. The method of claim 16, wherein transmitting the one or more feedback communications in the feedback reporting resource comprises:
transmitting the one or more feedback communications in one or more adjacent symbols included in the feedback reporting resource.

20. The method of claim 16,
wherein the plurality of feedback reporting resources are configured for each UE of a plurality of UEs, and
wherein the plurality of UEs include the UE and the other UE.

21. A method of wireless communication performed by a user equipment (UE), comprising:
transmitting a sidelink communication on a sidelink between the UE and another UE; and
receiving, on the sidelink, one or more feedback communications associated with the sidelink communication in a feedback reporting resource identified from a plurality of feedback reporting resources for the sidelink,
wherein the one or more feedback communications are in a physical sidelink feedback channel (PSFCH) associated with the feedback reporting resource, and
wherein the plurality of feedback reporting resources are configured with a multi-slot periodicity indicating that a period of the plurality of feedback reporting resources spans multiple slots in a resource pool for the sidelink.

22. The method of claim 21, further comprising:
identifying the feedback reporting resource based at least in part on a starting slot of the feedback reporting resource being adjacent to a slot in which transmission of the sidelink communication completed.

23. The method of claim 21, further comprising:
identifying the feedback reporting resource based at least in part on the feedback reporting resource occurring at least a threshold quantity of slots after a slot in which transmission of the sidelink communication completed.

24. The method of claim 21, wherein receiving the one or more feedback communications in the feedback reporting resource comprises:
receiving the one or more feedback communications in one or more symbols included in the feedback reporting resource.

25. The method of claim 24, wherein the one or more symbols are adjacent symbols; and
wherein the feedback reporting resource comprises:
a first transmit-receive turnaround symbol adjacent to a first symbol of the one or more symbols, and
a second transmit-receive turnaround symbol adjacent to a second symbol of the one or more symbols.

26. The method of claim 21, further comprising:
identifying the feedback reporting resource based at least in part on a processing capability of the other UE.

27. The method of claim 21, further comprising:
identifying the feedback reporting resource based at least in part on a quality of service (QoS) level associated with the sidelink communication.

28. A method of wireless communication performed by a user equipment (UE), comprising:
transmitting a sidelink communication on a sidelink between the UE and another UE; and
receiving, on the sidelink, one or more feedback communications associated with the sidelink communication in a feedback reporting resource identified from a plurality of feedback reporting resources for the sidelink,
wherein the one or more feedback communications are in a physical sidelink feedback channel (PSFCH) associated with the feedback reporting resource, and
wherein the plurality of feedback reporting resources are configured to occupy an entire bandwidth of a resource pool configured for the sidelink.

29. The method of claim 28, wherein the plurality of feedback reporting resources are configured with a periodicity comprising one or multiple slots.

30. The method of claim 28, wherein a feedback communication, of the one or more feedback communications, occupies less than the entire bandwidth.

31. The method of claim 28, wherein receiving the one or more feedback communications in the feedback reporting resource comprises:
receiving the one or more feedback communications in one or more adjacent symbols included in the feedback reporting resource.

32. The method of claim 28,
wherein the plurality of feedback reporting resources are configured for each UE of a plurality of UEs, and
wherein the plurality of UEs include the UE and the other UE.

33. An apparatus comprising:
means for receiving a sidelink communication on a sidelink between the apparatus and another apparatus;
means for identifying a feedback reporting resource from a plurality of feedback reporting resources for the sidelink,
wherein the plurality of feedback reporting resources are configured with a multi slot periodicity indicating that a period of the plurality of feedback reporting resources spans multiple slots in a resource pool for the sidelink; and
means for transmitting, on the sidelink, one or more feedback communications associated with the sidelink communication in the feedback reporting resource,
the one or more feedback communications being transmitted in a physical sidelink feedback channel (PSFCH) associated with the feedback reporting resource.

34. The apparatus of claim 33, wherein the means for identifying the feedback reporting resource comprises:
means for identifying the feedback reporting resource based at least in part on the feedback reporting resource occurring at least a threshold quantity of slots after a slot in which transmission of the sidelink communication completed.

35. The apparatus of claim 33, wherein the means for transmitting the one or more feedback communications in the feedback reporting resource comprises:
means for transmitting the one or more feedback communications in one or more symbols included in the feedback reporting resource.

36. The apparatus of claim 33, wherein the one or more feedback communications comprise a hybrid automatic repeat request (HARQ) communication that is transmitted in the PSFCH.

37. The apparatus of claim 33, wherein the means for transmitting the one or more feedback communications in the feedback reporting resource comprises:
means for transmitting the one or more feedback communications in one or more resource blocks (RBs) of one or more symbols included in the feedback reporting resource,
the one or more RBs being associated with a slot in which transmission of the sidelink communication completed.

38. The apparatus of claim 33, wherein the means for identifying the feedback reporting resource comprises:
means for identifying the feedback reporting resource based at least in part on the feedback reporting resource occurring at least a threshold quantity of slots after a last slot of the sidelink communication.

39. The apparatus of claim 33, wherein the means for transmitting the one or more feedback communications in the feedback reporting resource comprises:
means for transmitting the one or more feedback communications in symbols included in the feedback reporting resource.

40. The apparatus of claim 33, wherein the means for transmitting the one or more feedback communications in the feedback reporting resource comprises:
means for transmitting the one or more feedback communications in resource blocks (RBs) of symbols included in the feedback reporting resource,
the RBs being associated with a last slot of the sidelink communication.

41. An apparatus comprising:
means for receiving a sidelink communication on a sidelink between the apparatus and another apparatus;
means for identifying a feedback reporting resource from a plurality of feedback reporting resources for the sidelink,
wherein the plurality of feedback reporting resources are configured to occupy an entire bandwidth of a resource pool configured for the sidelink; and
means for transmitting, on the sidelink, one or more feedback communications associated with the sidelink communication in the feedback reporting resource,
the one or more feedback communications being transmitted in a physical sidelink feedback channel (PSFCH) associated with the feedback reporting resource.

42. The apparatus of claim 41, wherein the plurality of feedback reporting resources have a multi-slot periodicity.

43. An apparatus comprising:
means for transmitting a sidelink communication on a sidelink between the apparatus and another apparatus; and
means for receiving, on the sidelink, one or more feedback communications associated with the sidelink communication in a feedback reporting resource identified from a plurality of feedback reporting resources for the sidelink,
wherein the one or more feedback communications are a physical sidelink feedback channel (PSFCH) associated with the feedback reporting resource, and
wherein the plurality of feedback reporting resources are configured with a multi-slot periodicity indicating that a period of the plurality of feedback reporting resources spans multiple slots in a resource pool for the sidelink.

44. An apparatus comprising:
means for transmitting a sidelink communication on a sidelink between the apparatus and another apparatus; and
means for receiving, on the sidelink, one or more feedback communications associated with the sidelink communication in a feedback reporting resource identified from a plurality of feedback reporting resources for the sidelink,
wherein the one or more feedback communications are transmitted in a physical sidelink feedback channel (PSFCH) associated with the feedback reporting resource, and
wherein the plurality of feedback reporting resources are configured to occupy an entire bandwidth of a resource pool configured for the sidelink.

45. The apparatus of claim 44, wherein the plurality of feedback reporting resources have a multi-slot periodicity.

46. The apparatus of claim 44, wherein the one or more feedback communications comprise a hybrid automatic repeat request (HARQ) communication that is transmitted in the PSFCH.

47. A user equipment (UE) for wireless communication, comprising:
a memory; and
one or more processors coupled to the memory, the one or more processors configured to:
receive a sidelink communication on a sidelink between the UE and another UE;
identify a feedback reporting resource from a plurality of feedback reporting resources for the sidelink, wherein the plurality of feedback reporting resources are configured with a multi slot periodicity indicating that a period of the plurality of feedback reporting resources spans multiple slots in a resource pool for the sidelink; and transmit, on the sidelink, one or more feedback communications associated with the sidelink communication in the feedback reporting resource, the one or more feedback communications being transmitted in a physical sidelink feedback channel (PSFCH) associated with the feedback reporting resource.

48. The UE of claim 47, wherein the one or more processors, when identifying the feedback reporting resource, are configured to:

identify the feedback reporting resource based at least in part on the feedback reporting resource occurring at least a threshold quantity of slots after a slot in which transmission of the sidelink communication completed.

49. The UE of claim 47, wherein the one or more processors, when transmitting the one or more feedback communications in the feedback reporting resource, are configured to:

transmit the one or more feedback communications in one or more symbols included in the feedback reporting resource.

50. The apparatus of claim 33, wherein the means for transmitting the one or more feedback communications in the feedback reporting resource comprises:

means for transmitting the one or more feedback communications in symbols included in the feedback reporting resource.

51. The apparatus of claim 47, wherein the one or more feedback communications comprise a hybrid automatic repeat request (HARQ) communication that is transmitted in the PSFCH.

52. The UE of claim 41, wherein the memory and the one or more processors, when transmitting the one or more feedback communications in the feedback reporting resource, are configured to:

transmit the one or more feedback communications in one or more resource blocks (RBs) of one or more symbols included in the feedback reporting resource, the one or more RBs being associated with a slot in which transmission of the sidelink communication completed.

53. The UE of claim 52, wherein the one or more resource blocks (RBs) include a plurality of resource blocks.

54. The UE of claim 47, wherein the one or more processors, when identifying the feedback reporting resource, are configured to:

identify the feedback reporting resource based at least in part on the feedback reporting resource occurring at least a threshold quantity of slots after a last slot of the sidelink communication.

55. The UE of claim 47, wherein the one or more processors, when transmitting the one or more feedback communications in the feedback reporting resource, are configured to:

transmit the one or more feedback communications in symbols included in the feedback reporting resource.

56. The UE of claim 47, wherein the one or more processors, when transmitting the one or more feedback communications in the feedback reporting resource, are configured to:

transmit the one or more feedback communications in resource blocks (RBs) of symbols included in the feedback reporting resource, the RBs being associated with a last slot of the sidelink communication.

57. A non-transitory computer-readable medium storing a set of instructions for wireless communication, the set of instructions comprising:

one or more instructions that, when executed by one or more processors of a user equipment (UE), cause the UE to:

receive a sidelink communication on a sidelink between the UE and another UE;

identify a feedback reporting resource from a plurality of feedback reporting resources for the sidelink, wherein the plurality of feedback reporting resources are configured with a multi slot periodicity indicating that a period of the plurality of feedback reporting resources spans multiple slots in a resource pool for the sidelink; and transmit, on the sidelink, one or more feedback communications associated with the sidelink communication in the feedback reporting resource, the one or more feedback communications being transmitted in a physical sidelink feedback channel (PSFCH) associated with the feedback reporting resource.

58. The non-transitory computer-readable medium of claim 57, wherein the one or more instructions, that cause the UE to identify the feedback reporting resource, cause the UE to:

identify the feedback reporting resource based at least in part on the feedback reporting resource occurring at least a threshold quantity of slots after a slot in which transmission of the sidelink communication completed.

59. The non-transitory computer-readable medium of claim 57, wherein the one or more instructions, that cause the UE to transmit the one or more feedback communications in the feedback reporting resource, cause the UE to:

transmit the one or more feedback communications in one or more symbols included in the feedback reporting resource.

60. The non-transitory computer-readable medium of claim 48, wherein the one or more feedback communications comprise a hybrid automatic repeat request (HARQ) communication that is transmitted in the PSFCH.

61. The non-transitory computer-readable medium of claim 48, wherein the one or more instructions, that cause the UE to transmit the one or more feedback communications in the feedback reporting resource, cause the UE to:

transmit the one or more feedback communications in one or more resource blocks (RBs) of one or more symbols included in the feedback reporting resource, the one or more RBs being associated with a slot in which transmission of the sidelink communication completed.

62. The non-transitory computer-readable medium of claim 57, wherein the one or more instructions, that cause the UE to identify the feedback reporting resource, cause the UE to:

identify the feedback reporting resource based at least in part on the feedback reporting resource occurring at least a threshold quantity of slots after a last slot of the sidelink communication.

63. The non-transitory computer-readable medium of claim 51, wherein the one or more instructions, that cause the UE to transmit the one or more feedback communications in the feedback reporting resource, cause the UE to:
   transmit the one or more feedback communications in symbols included in the feedback reporting resource.

64. The non-transitory computer-readable medium of claim 57, wherein the one or more instructions, that cause the UE to transmit the one or more feedback communications in the feedback reporting resource, cause the UE to:
   transmit the one or more feedback communications in resource blocks (RBs) of symbols included in the feedback reporting resource,
      the RBs being associated with a last slot of the sidelink communication.

65. A user equipment (UE) for wireless communication, comprising:
   a memory; and
   one or more processors coupled to the memory, the memory and the one or more processors configured to:
      transmit a sidelink communication on a sidelink between the UE and another UE; and
      receive, on the sidelink, one or more feedback communications associated with the sidelink communication in a feedback reporting resource identified from a plurality of feedback reporting resources for the sidelink,
         wherein the one or more feedback communications are transmitted in a physical sidelink feedback channel (PSFCH) associated with the feedback reporting resource, and
         wherein the plurality of feedback reporting resources are configured with a multi-slot periodicity indicating that a period of the plurality of feedback reporting resources spans multiple slots in a resource pool for the sidelink.

66. The UE of claim 65, wherein the one or more feedback communications comprise a hybrid automatic repeat request (HARQ) communication that is transmitted in the PSFCH.

67. A non-transitory computer-readable medium storing a set of instructions for wireless communication, the set of instructions comprising:
   one or more instructions that, when executed by one or more processors of a user equipment (UE), cause the UE to:
      transmit a sidelink communication on a sidelink between the UE and another UE; and
      receive, on the sidelink, one or more feedback communications associated with the sidelink communication in a feedback reporting resource identified from a plurality of feedback reporting resources for the sidelink,
         wherein the one or more feedback communications are transmitted in a physical sidelink feedback channel (PSFCH) associated with the feedback reporting resource, and
         wherein the plurality of feedback reporting resources are configured with a multi-slot periodicity indicating that a period of the plurality of feedback reporting resources spans multiple slots in a resource pool for the sidelink.

68. The non-transitory computer-readable medium of claim 67, wherein the one or more feedback communications comprise a hybrid automatic repeat request (HARQ) communication that is transmitted in the PSFCH.

69. A user equipment (UE) for wireless communication, comprising:
   a memory; and
   one or more processors coupled to the memory, the one or more processors configured to:
      transmit a sidelink communication on a sidelink between the UE and another UE; and
      receive, on the sidelink, one or more feedback communications associated with the sidelink communication in a feedback reporting resource identified from a plurality of feedback reporting resources for the sidelink,
         wherein the one or more feedback communications are in a physical sidelink feedback channel (PSFCH) associated with the feedback reporting resource, and
         wherein the plurality of feedback reporting resources are configured with a multi-slot periodicity indicating that a period of the plurality of feedback reporting resources spans multiple slots in a resource pool for the sidelink.

70. The UE of claim 69, wherein the one or more feedback communications comprise a hybrid automatic repeat request (HARQ) communication that is in the PSFCH.

* * * * *